(12) United States Patent
Chien

(10) Patent No.: US 8,827,511 B2
(45) Date of Patent: Sep. 9, 2014

(54) LED LIGHT WITH CHANGEABLE LED POSITION WITH PREFERABLE POWER SOURCE

(76) Inventor: Tseng-Lu Chien, Shi-Chi (TW)

(*) Notice: Subject to any disclaimer, the term of this patent is extended or adjusted under 35 U.S.C. 154(b) by 0 days.

(21) Appl. No.: 12/073,889

(22) Filed: Mar. 11, 2008

(65) Prior Publication Data

US 2008/0266856 A1 Oct. 30, 2008

(51) Int. Cl.
| F21S 8/00 | (2006.01) |
| F21S 9/02 | (2006.01) |
| F21S 10/00 | (2006.01) |
| F21V 21/14 | (2006.01) |
| F21V 21/08 | (2006.01) |
| F21S 4/00 | (2006.01) |
| F21V 29/00 | (2006.01) |
| F21V 14/02 | (2006.01) |
| F21V 23/04 | (2006.01) |
| F21V 9/08 | (2006.01) |
| F21W 121/00 | (2006.01) |
| F21V 21/29 | (2006.01) |
| F21Y 101/02 | (2006.01) |
| F21V 21/22 | (2006.01) |
| F21V 21/30 | (2006.01) |
| F21S 2/00 | (2006.01) |

(52) U.S. Cl.
CPC .............. F21S 8/038 (2013.01); *F21V 23/0442* (2013.01); F21S 9/022 (2013.01); F21S 10/002 (2013.01); *F21V 9/08* (2013.01); *F21W 2121/00* (2013.01); *Y10S 362/80* (2013.01); *F21V 21/29* (2013.01); F21S 8/035 (2013.01); F21V 21/14 (2013.01); F21V 21/08 (2013.01); *F21Y 2101/02* (2013.01); *F21V 21/22* (2013.01); *F21V 21/30* (2013.01); *F21S 2/005* (2013.01); F21S 4/008 (2013.01); F21V 29/00 (2013.01); *Y02B 10/30* (2013.01); F21V 23/04 (2013.01); F21V 14/02 (2013.01)
USPC . 362/427; 362/225; 362/249.02; 362/249.03; 362/249.06; 362/219; 362/800

(58) Field of Classification Search
USPC .......... 362/219, 225, 249.02, 249.03, 249.04, 362/249.05, 249.06, 249.07–249.11, 275, 362/287

See application file for complete search history.

(56) References Cited

U.S. PATENT DOCUMENTS

| 6,019,477 A * | 2/2000 | Wegrzyn et al. ................. 362/20 |
| 6,135,624 A * | 10/2000 | Masters et al. ................. 362/432 |
| 6,158,882 A * | 12/2000 | Bischoff, Jr. .................. 362/488 |
| 6,462,669 B1 * | 10/2002 | Pederson ................. 340/815.45 |
| 2001/0024891 A1 * | 9/2001 | Chien .............................. 439/66 |
| 2006/0187658 A1 * | 8/2006 | Evans et al. ................... 362/234 |
| 2007/0091605 A1 * | 4/2007 | Horibata ....................... 362/252 |
| 2008/0080187 A1 * | 4/2008 | Purinton ....................... 362/294 |

* cited by examiner

Primary Examiner — Thomas Sember
Assistant Examiner — Tsion Tumebo
(74) Attorney, Agent, or Firm — Bacon & Thomas, PLLC

(57) ABSTRACT

A light device includes housing-units and joints-that can change orientation, position, viewing angle, or other properties to allow the light device to emit light beams in a desired direction.

16 Claims, 19 Drawing Sheets

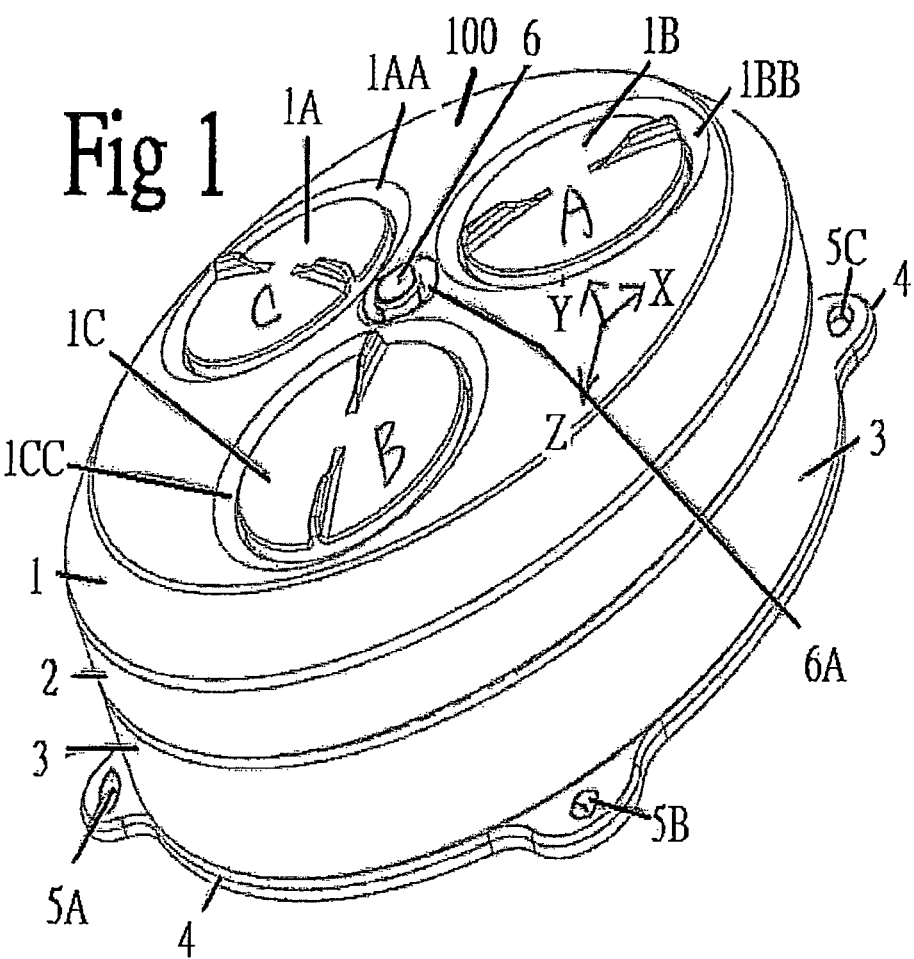

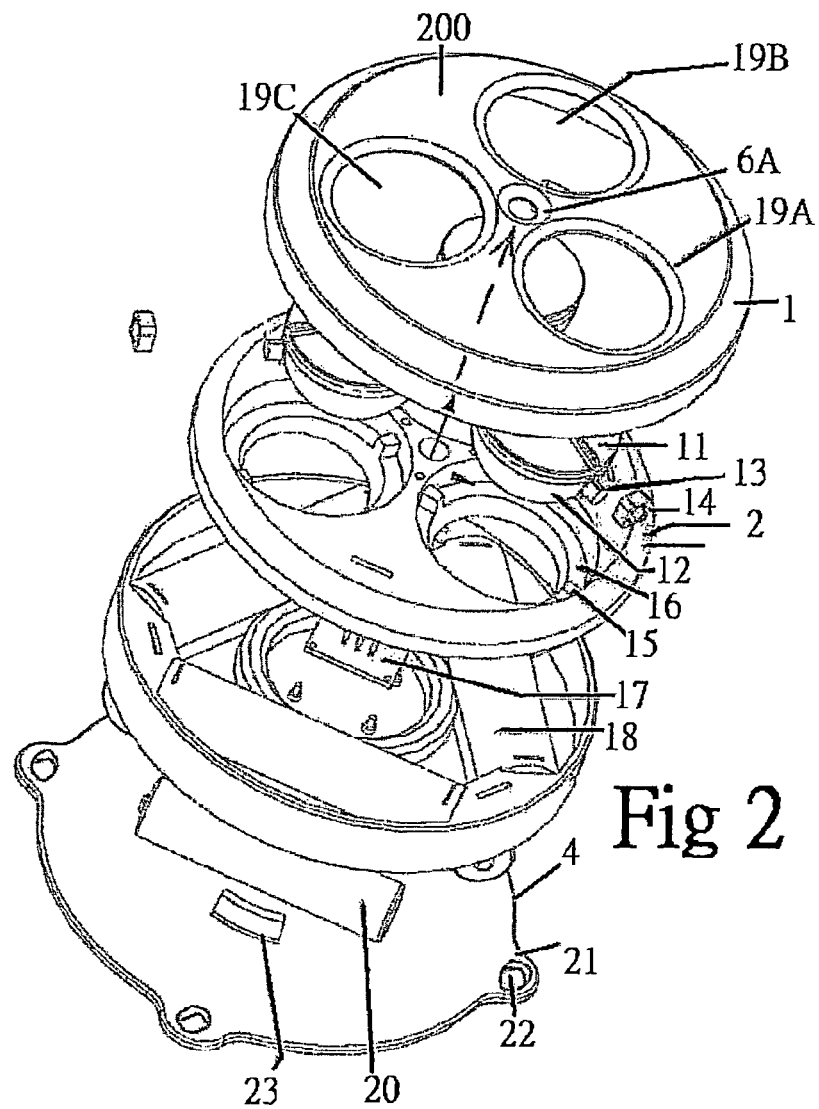

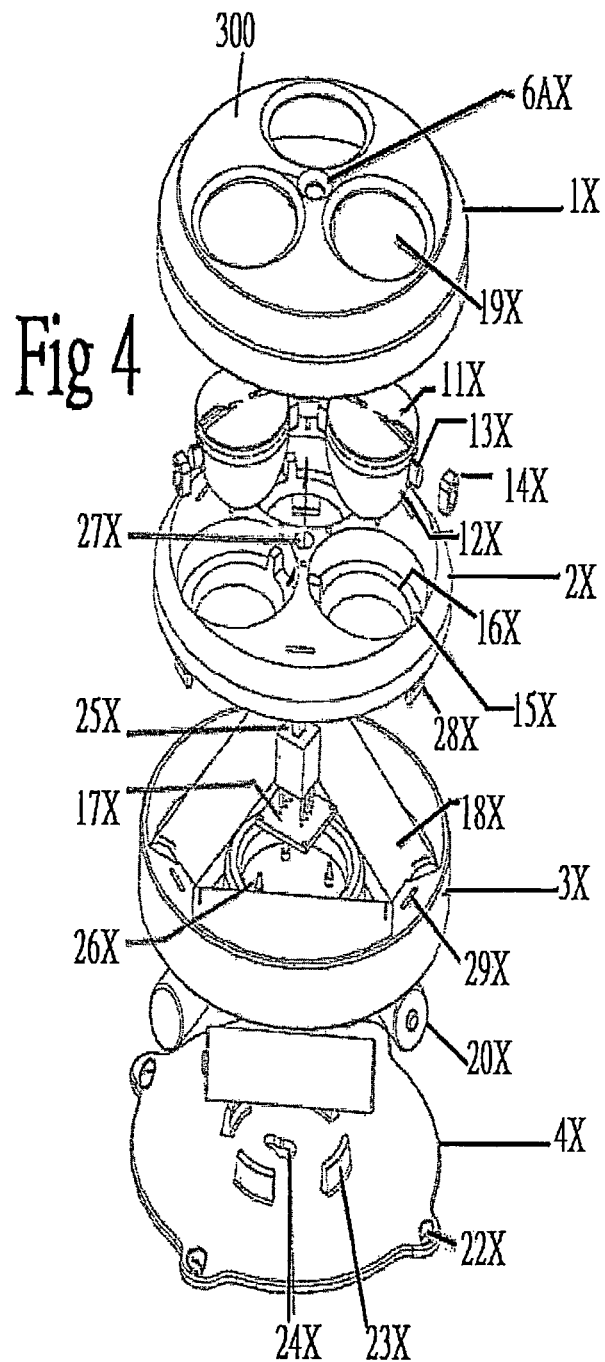

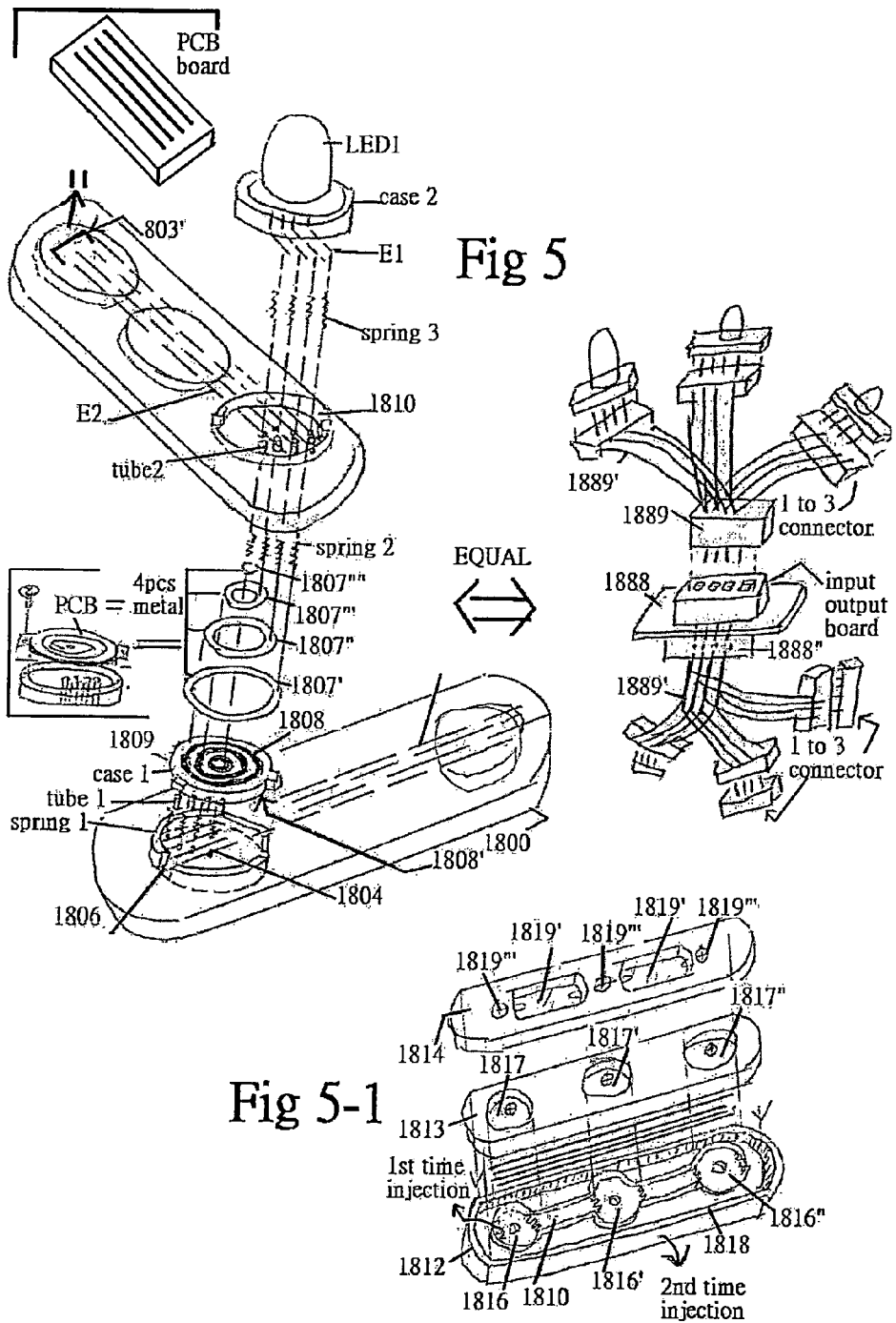

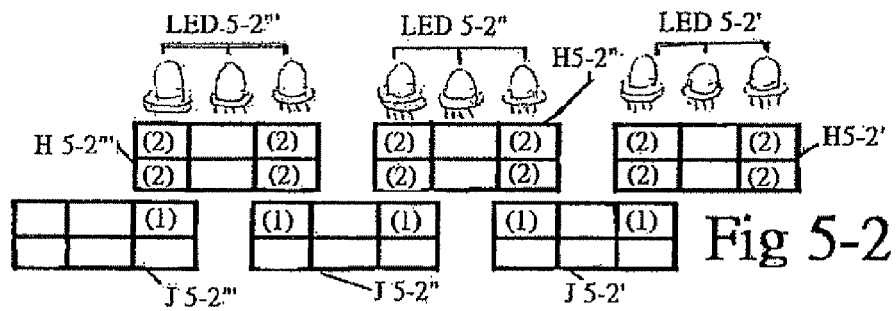
Fig 5-2
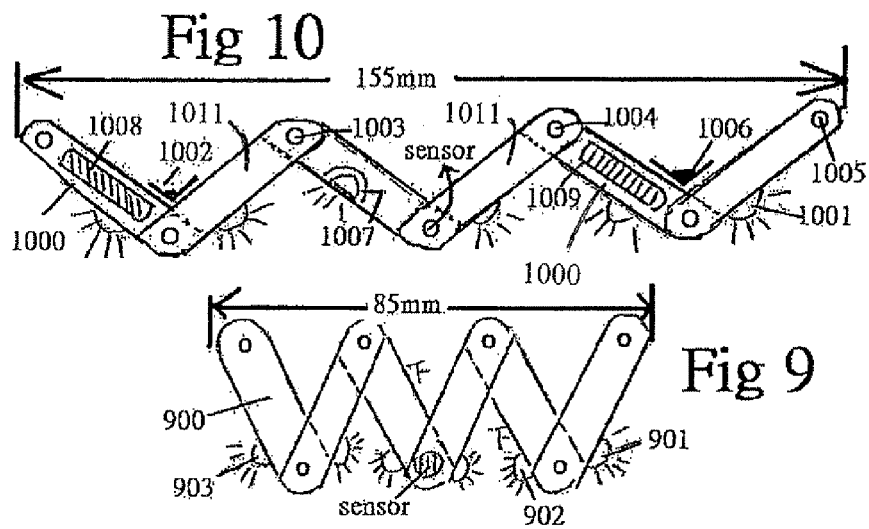
Fig 10
Fig 9
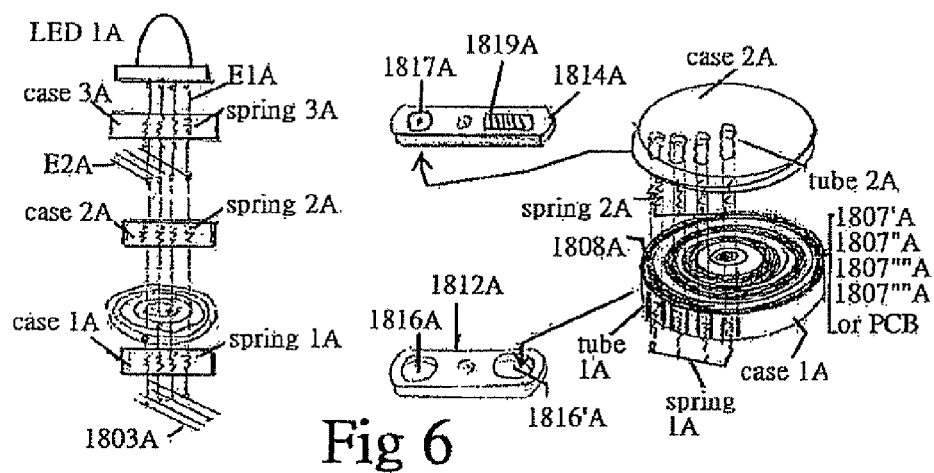
Fig 6

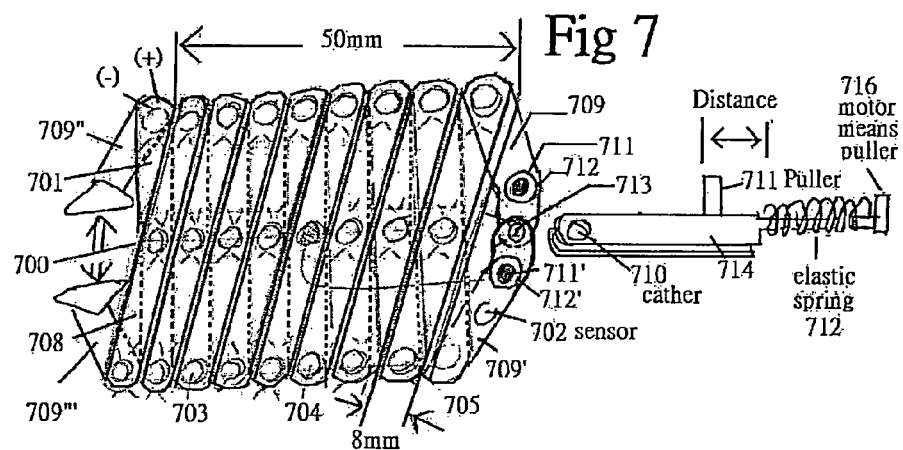
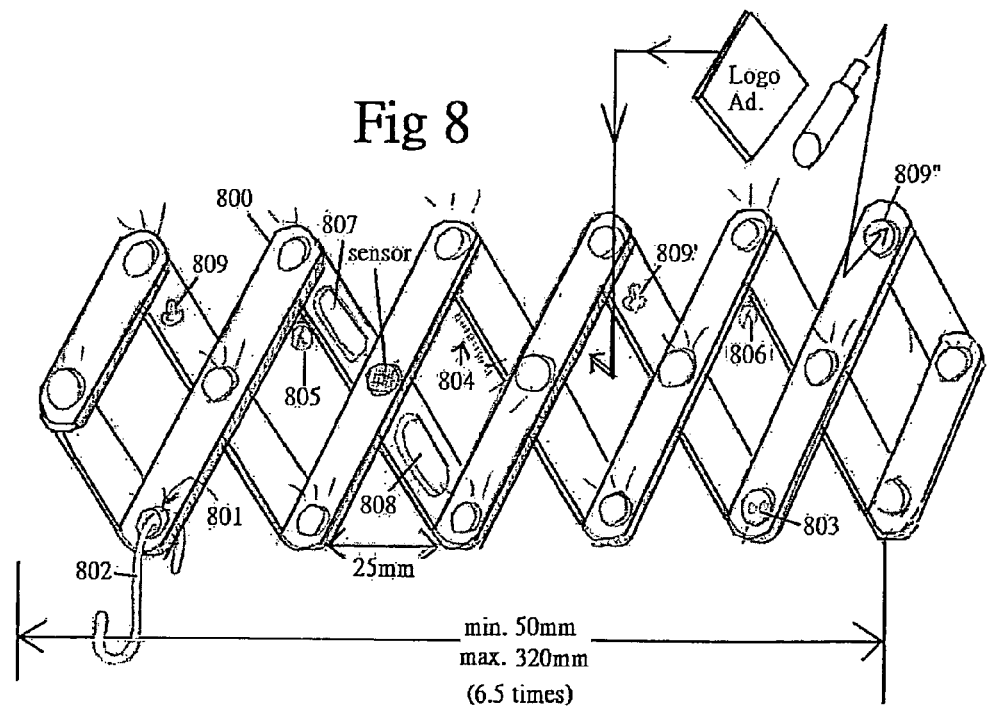

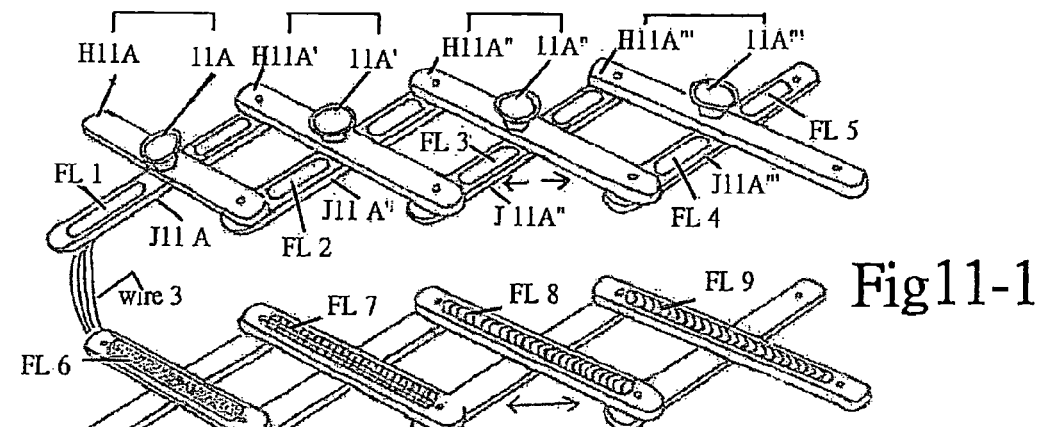
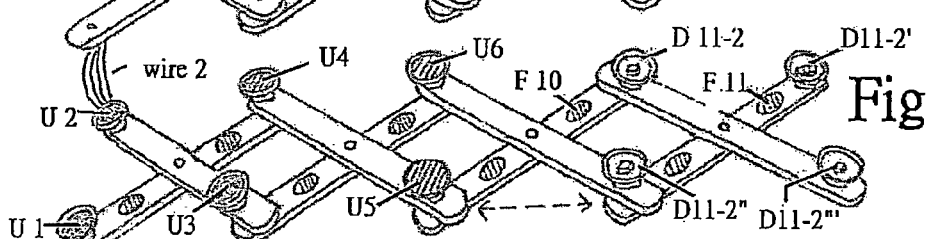
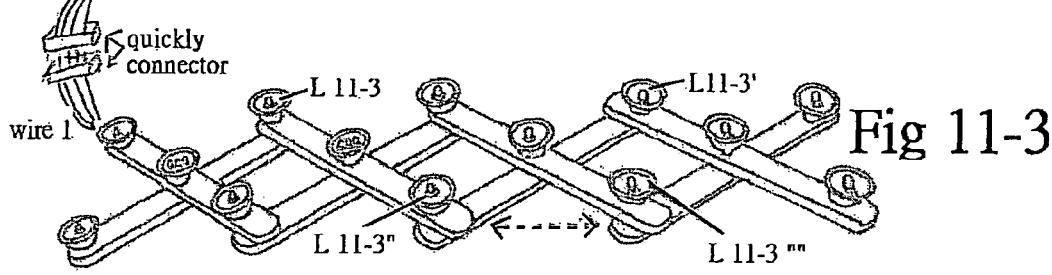
Fig 11

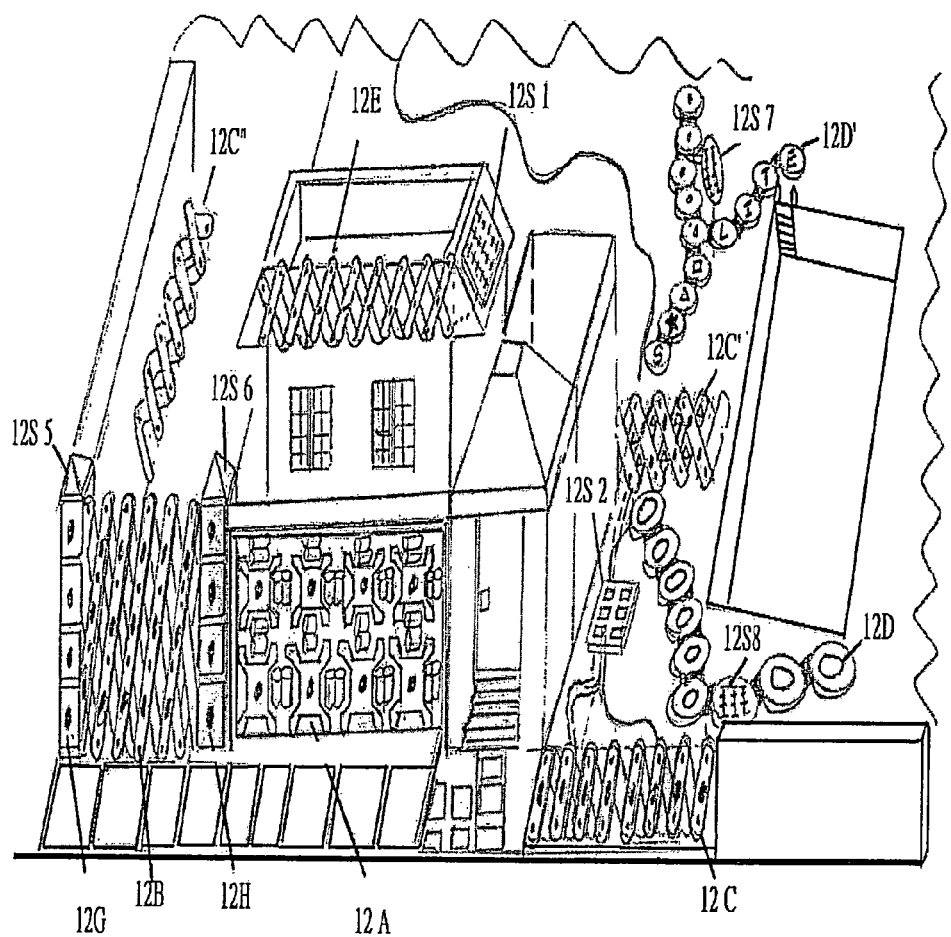
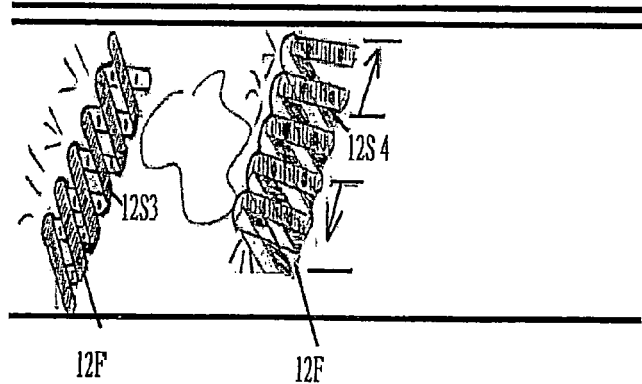
Fig. 12

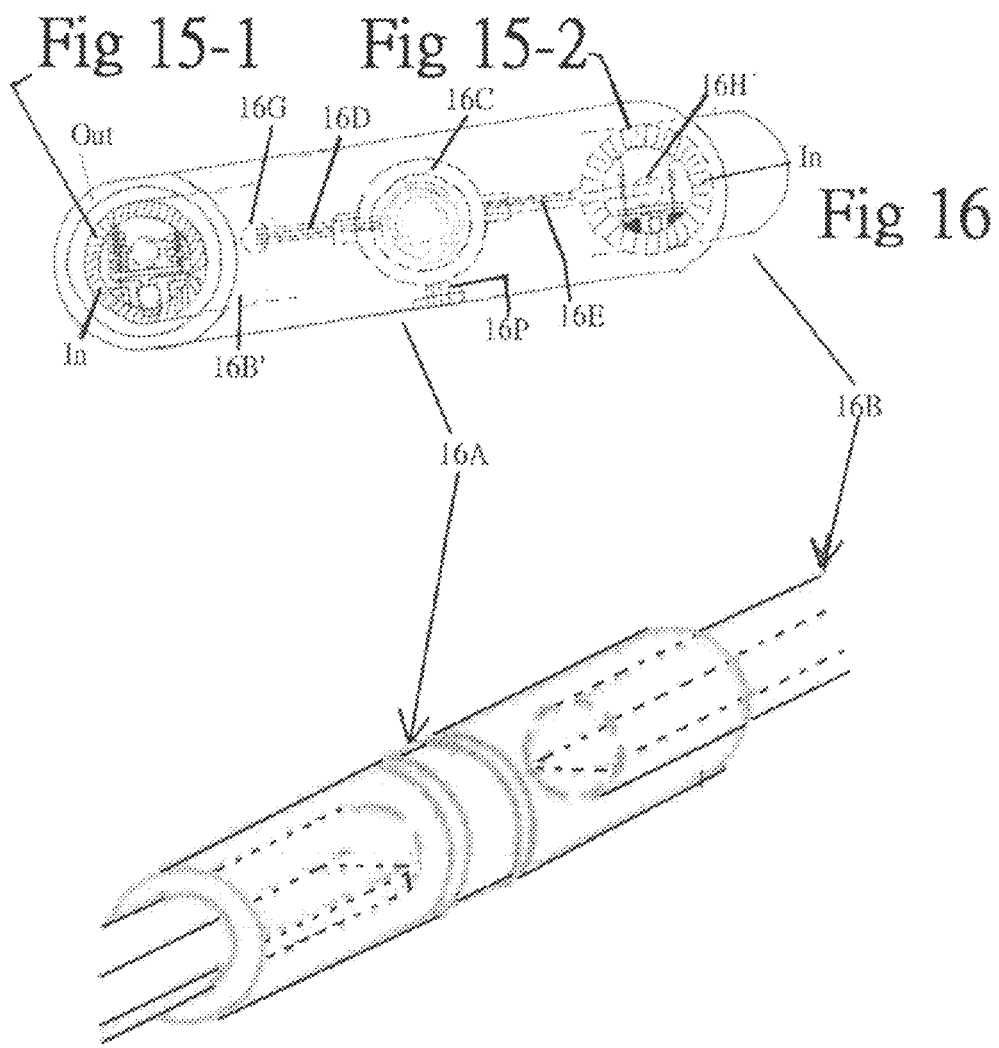

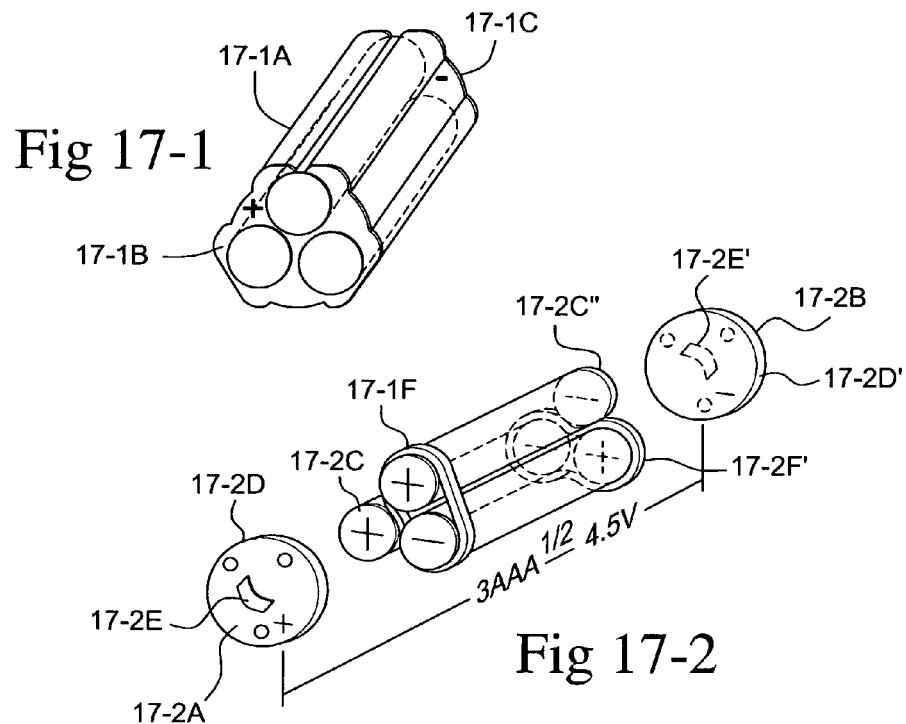
Fig 17-1
Fig 17-2
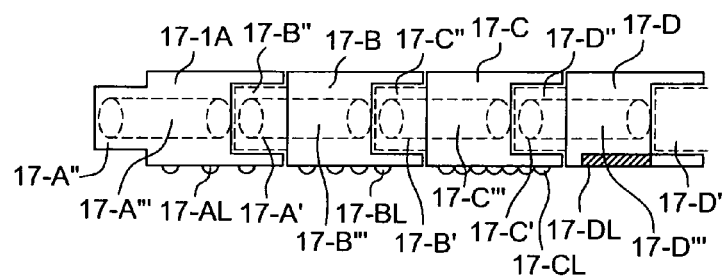
Fig 17
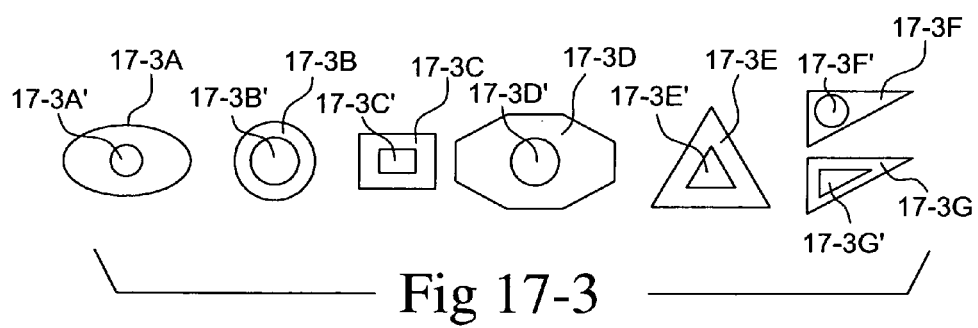
Fig 17-3

LED LIGHT WITH CHANGEABLE LED POSITION WITH PREFERABLE POWER SOURCE

BACKGROUND OF THE INVENTION

This application has subject matter in common with or related to the subject matter of copending U.S. patent application Ser. No. 12/073,889 ("LED light with changeable geometric system"); Ser. No. 12/003,691 ("LED light with changeable geometric dimension features"); Ser. No. 12/003,809 ("LED light with changeable features"); Ser. No. 11/806,711 ("Multiple LED light with adjustable angle features"); Ser. No. 10/883,747 ("Fiber Optic light kits for footwear"); Ser. No. 11/092,741 ("Night light with fiber optics"); Ser. No. 11/094,215 ("LED Night light with Liquid optics medium"); Ser. No. 11/255,981 ("Multiple light source Night Light"); Ser. No. 11/498,881 ("Poly Night light"); Ser. No. 11/527,631 ("LED Night light with interchangeable display unit"); Ser. No. 11/498,874 ("Area Illumination for LED night light"); Ser. No. 11/527,629 ("Time Piece with LED night light"); Ser. No. 11/527,628 ("Multiple Function Night light with Air Freshener"); Ser. No. 11/806,284 ("LED Night light with more than one optics mediums"); Ser. No. 11/806,285 ("LED Night Light with multiple function") Ser. No. 11/806,711 ("Multiple LEDs Light with adjustable angle function").

The current invention concerns an LED light device in which the LEDs' orientation, position, or light emitting direction, or the device's shape, may be changed. This feature creates flexible and changeable features that allow the light device to fit for all kinds of installation area space and overcome the conventional LED light devices' limitation of having one fixed size to become a universal LED light device the consumer.

The LED light device with a changeable geometric dimension function of the current invention has at least one LED installed within a housing-unit or joint-means at a desired location with respect to the x, y, or z axis of a three-dimensional coordinate system, the housing-units being connected by at least one of the joint-means, the joint-means delivering electric signals from a power source to desired LEDs, the housing means further incorporating an Integrated Circuit, circuit means, switch means, and/or sensor means to provide illumination according to a pre-determined light performance. The LED light device's geometric dimensions will be changed whenever the original housing-unit or joint-means is varied. The LED light device incorporates conventional attachment means to install the light device on any main object. The power source can be an alternating current (AC) or direct current (DC) source and both types of power source can utilize power available from the market, scientific fields, chemical treatment, physics theory, biology, solar modules, batteries, wind power, generators, handheld generators, or motor generators.

The current invention provides an improvement over LED light devices that are limited to a fixed shape, fixed illumination areas, fixed brightness, fixed viewing angle, fixed design, and bad size for different locations. There is no LED light device that can fit anywhere, with addable brightness and illumination areas, and that is bendable to form a wine rack under a cabinet, or that can have an additional hook function to hang any items inside a kitchen, living room, bathroom, kids room, entertainment room, garden, patio, boat, car, van, bus, truck, train, airplane, transportation equipment, playground, or outdoors. The invention addresses economic and environmental concerns, by providing an LED light device capable of changing its geometric shape to fit anywhere people want power saving LED light kits. In addition, all preferred embodiments of the invention have optional properties that allow people to make different-looking LED light devices with required brightness to illuminate different with a self-designed light device shape, and yet that have numerous common parts for the housing-unit and joint-unit to form standard equipment and thereby avoid too much plastic, LEDs, or circuit waste to ruin the environment. This is a very green concept for the LED light device of the current invention.

The inventor's copending U.S. patent application Ser. No. 11/255,981 discloses a night light with more than one light source and the inventor's copending U.S. patent application Ser. No. 11/806,284 discloses a night light with more than one optics medium. The technical improvements provided by both inventions are very important when applied to a light emitting diode (LED) because they can make the LED's spot light become a very good photometric arrangement that looks like conventional non-LED light means such as an incandescent bulb, fluorescent tube, or halogen bulb light to cause the multiple LED light of the current invention to become very useful to human beings.

The current invention can use a plurality of LEDs with more than one optics medium to enable the multiple LED light be used in a variety of applications including a night light, indoor lighting, cabinet light, under-table light, decorative lighting, anywhere light, reading light, painting light, floor light, bathroom light, and outdoor lighting by turning the narrow viewing angle LED light source into a surface light similar to a conventional incandescent bulb, fluorescent tube, halogen bulb or other type available from the marketplace.

The current invention further incorporates adjust-means to provide the multiple LED light with adjustment functions to make the multiple LED light really practical for installation anywhere including indoor, outdoor, and public areas.

The current invention not only provides a simple, functional LED light, but combines excellent light performance with adjust-means to build improved multiple LED light. The multiple LED light has more than one LED and may have more than one optics means with adjustment means to cause the multiple LED light to become very useful to people and supply great and convenient illumination to all human beings.

The current invention has wider application as a replacement for different light means including an incandescent bulb, fluorescent lamp, halogen bulb, electro-luminescent elements, cold cathode tube, and any other conventional light means available from the marketplace which has the same function or equivalent functions as LEDs or LED-units to offer the illumination to all people with geometric shape, size, and dimension changeable features that provides each light means with changeable orientation, position etc.

BRIEF DESCRIPTION OF THE DRAWINGS

FIG. 5 shows a conductive means arrangement for a second preferred multiple LED or LED unit embodiment of FIGS. 9 and 10.

FIG. 5-1 shows a plastic injection procedure to provide a perfect construction and arrangement for the multiple LED or LED unit preferred embodiment of FIGS. 5 and 10.

FIG. 5-2 a construction and arrangement for the preferred multiple LED or LED unit embodiment of FIGS. 9 and 10.

FIG. 6 shows the preferred embodiment of FIGS. 9 and 10 with details of the conductive means, hold tray, and plastic housing-units for the multiple LED or LED-unit light.

FIGS. 7 and 8 show a third preferred embodiment of an LED light device with LED orientation, position, light emitting direction, or device shape changing features FIGS. 9, 10, 9-1, and 10-1 is another view of the third preferred embodiment.

FIG. 11 shows a fourth preferred embodiment of an LED light with changeable geometric dimension function in which at least one LED is installed within a housing-unit or joint-means at a desired location along the x, y, or z axis and the housing-units are connected by at least one joint-means which has a desired shape and size, and is arranged to deliver an electric signal from a power source which may be in the form of a direct or alternating current source selected from the group including a solar module, batteries, wind power source, generator, hand held generator, or motor generator) to desired LEDs or LED-units that may include an integrated circuit (IC), circuit means, switch means, and/or sensor means to provide illumination having a pre-determined light performance, and further in which the LED light's geometric dimension will be changed when any variation is applied to the original housing-unit or joint-means, the LED light device incorporating conventional attachment means to install it on any main object.

FIG. 11-1 to FIG. 11-3 show different LEDs or LED-units arranged on the housing-unit or joint-means to provide a desired spot light, surface light, area light, swivel light, rotating light effects and performance with pre-determined functions, color, light brightness, illumination, and/or light viewing direction.

FIGS. 12-1 to 12-3 some preferred embodiments for a solar module with an LED or LED-unit light device for indoor or outdoor applications.

FIG. 12-4 show a preferred compartment to arrange a circuit means, IC, switch means, sensor means, batteries, conductive means, plug means, electric wire, circuit board, and/or other electric components.

FIGS. 13-1, 13-2, and 13-3 shows an electric conductive means arrangement for LEDs or LED-units that may be used with different preferred embodiments.

FIGS. 15-1 and 15-2 show the mechanical and electric construction for the inner bar of the fifth preferred embodiment (FIG. 13) to allow the inner bar's LEDs or LED-units to be turned on while the LEDs or LED-units are extended and cross the outside bar's edge.

FIG. 16 shows the mechanical and electric construction for electric signal delivery from the power source to two sides of the inner bar the fifth preferred embodiment, and in which the center two-way retractable conductive means are connected with the power source and supply the electric signals though the two-way retractable conductive means to each of the said inner bar's LEDs or LED-units.

FIG. 17 shows a sixth preferred embodiment of the current invention which includes addable and disassembleable LEDs or LED-units.

FIGS. 17-1 and FIG. 17-2 a battery case for the sixth preferred embodiment (FIG. 17) or other embodiments, including embodiments described in copending applications, which can easily fit into a cylinder body for the LED light and supply electric current to the LEDs or LED-units.

FIG. 17-3 shows a preferred but not limiting shape for an outside bar and an inner bar shape.

DETAILED DESCRIPTION OF THE PREFERRED EMBODIMENTS

Figure 3:
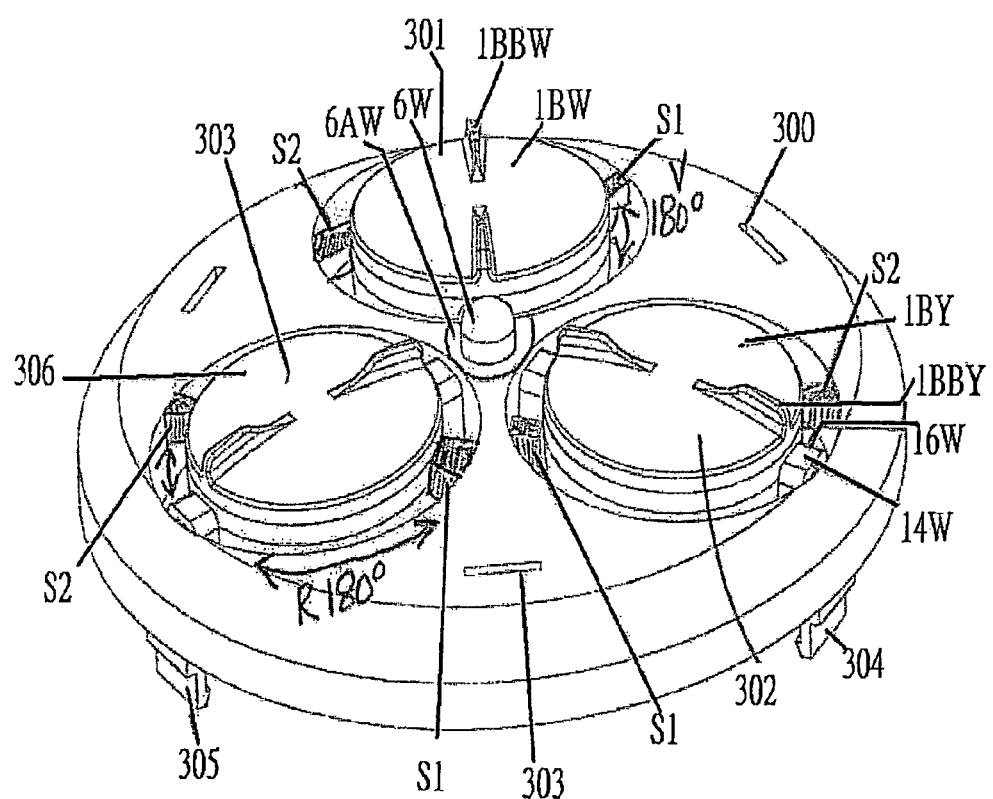
FIG. 3 shows an adjustable angle construction of the first preferred embodiment.

The current invention involves an LED or LED-unit light device in which the positions of the LEDs or LED-units is changeable relative to other LEDs or LED-units when an outside force is applied to the original geometric light device.

The current invention may use any power source and is not limited to a direct current (DC) or alternating current (AC) from batteries or home electricity because the invention is not limited to indoor application. The current invention may use any form of DC or AC current including current supplied by a solar module, wind power, water power, chemical power, corn power, food power, generator power, nature power, or battery power for indoor and outdoor application. Those skilled in the art will appreciate that the power source may be any kind of power source available from the convention market, scientific fields, and physics. The power source may be combined with desired conductive means selected from one or more conductive wire, conductive metal plate, conductive retractable device, conductive resilient member, conductive spring, conductive coil spring, conductive retractable metal ribbon, and/or conductive elastic member with proper arrangements for installation within a housing-unit, joint-unit, or compartment to deliver an electric signal from the power source to the LEDs or LED-units for desired light illumination.

The principles of the current invention may be applied to LEDs or LED-units including those described in copending applications or continuations in which the positions of the LEDs or LED-units is changeable relative to positions of other LEDs or LED-units, and principles of the copending applications may be applied to the current invention. It will be appreciated that these principles also provide LED or LED-unit light devices with geometric dimension or geometric system that is changeable when an outside force is applied to the LEDs or LED-units to change the LEDs' or LED-units' position, orientation, angle, view result, light emitting direction, and/or illumination area. The geometric shape, dimension, and/or system may be selected from any combination of a system or systems with rotary, gap-jumpable, extendable, foldable, distance-variable, extractable, connectable, disconnectable, extendable, retractable, expendable, addable, adjustable, bendable, overlappable, underlayable, assembleable, disassembleable, and/or flexible properties.

The current invention preferably includes a housing-unit and joint-means made of any of a variety of materials including wood, plastic, metal, chemical compounds, paper, ceramic, pottery, glass, concrete, bamboo, and/or recycled materials. The housing-unit and joint-means can be any desired size, dimension, or geometric shape to enable the preferred LEDs or LED-units light to fit into a desired space, with changeable dimension, size, and shape to enable universal applicability, rather than being limited to a fixed shape, size, dimension, or geometric system. This will be of great help people who will buy the light to fit into any space where people stay. A preferred conductive means is arranged within a compartment of the light in different preferred embodiments to enable the light to perform desired functions as will be described below.

The current invention has wider application to different light means which may include an incandescent bulb, fluorescent lamp, halogen bulb, electro-luminescent elements, cold cathode tube, and any other conventional light means available from the marketplace and having the same or equivalent functions as the above-mentioned LEDs or LED-unit to offer illumination for all people with changeable geometric shape, size, dimension, orientation, position etc.

Figures 1, 10:
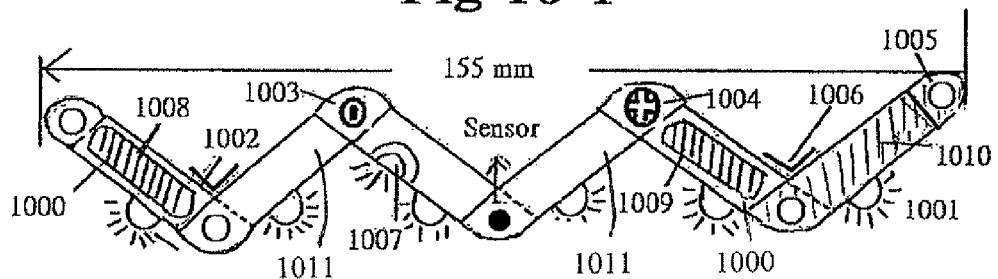

FIG. 1, shows a preferred embodiment of a multiple LEDs light device with adjustable angle features (100) which has a top cover (1), tray (2), battery compartment (3), and attachment base (4). The cover (1) has a plurality of holes (1A) (1B) (1C) to allow the plurality of LED-units to fit within. Each of the LED-units has a lens (1B), a housing (not shown here), an LED (not shown), and swivel means (not shown) that allows each of the LED-units to swivel on a vertical-axis (Y-axis) a certain number of degrees up and down and rotated on a horizontal axis (X-axis) a certain number of degrees right and left so that each LED's light beam can be emitted to a desired position while the multiple LEDs light device is in a fixed position. Hence, each of the LEDs or LED-units can change its position and/or orientation relative to other LEDs or LED-units by changing the tilt angle or rotating.

As shown in FIG. 1, The multiple LEDs light device (100) has three LED-units (A) (B) (C) within the holes of the cover (1). Each LED-unit can be swiveled on the y-axis through a predetermined angle and can also be rotated on the x-axis through a certain angle.

The plurality of LED-Units can each emit its own light beam in a desired direction and provide a desired location or areas with nice illumination. The tray (2), battery compartment (3), and attachment base (4) are assembled together to allow the multiple LEDs light device to be fixed on a desired surface.

Figures 1, 12:
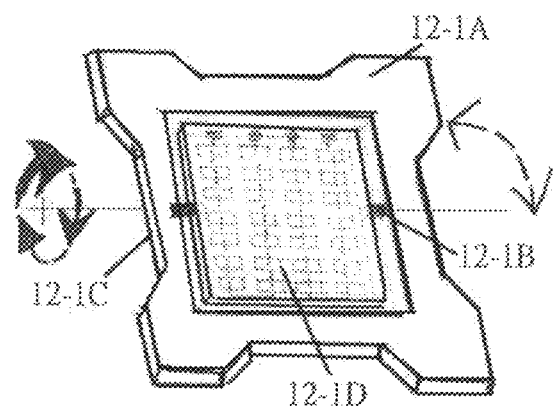
FIG. 1 shows a first preferred embodiment of an LED light with LED orientation, position, light emitting direction, or device shape changing features, and especially one in which the relative orientation, position, or light emitting direction of each LED may be changed with respect to other LEDs.
FIG. 12 illustrates application of an LED light of the invention to an outdoor application in which the power source is a solar module which can obtain direct current from a solar module and store it in rechargeable batteries and delivery the current to LEDs or LED-units through circuit means, an IC, switch means, sensor means, and/or timer means to provide desired illumination for the current invention and in which the position of the LEDs or LED-units is changeable with respect to that of other LEDs or LED-units.
Figures 2, 12:
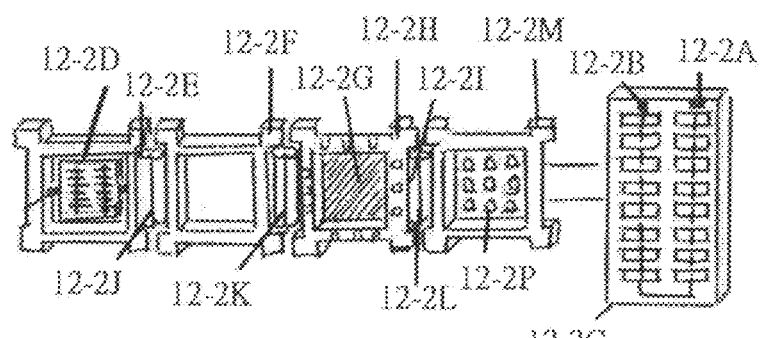
FIG. 2 shows the detailed construction of the first preferred embodiment.
Figures 3, 12:
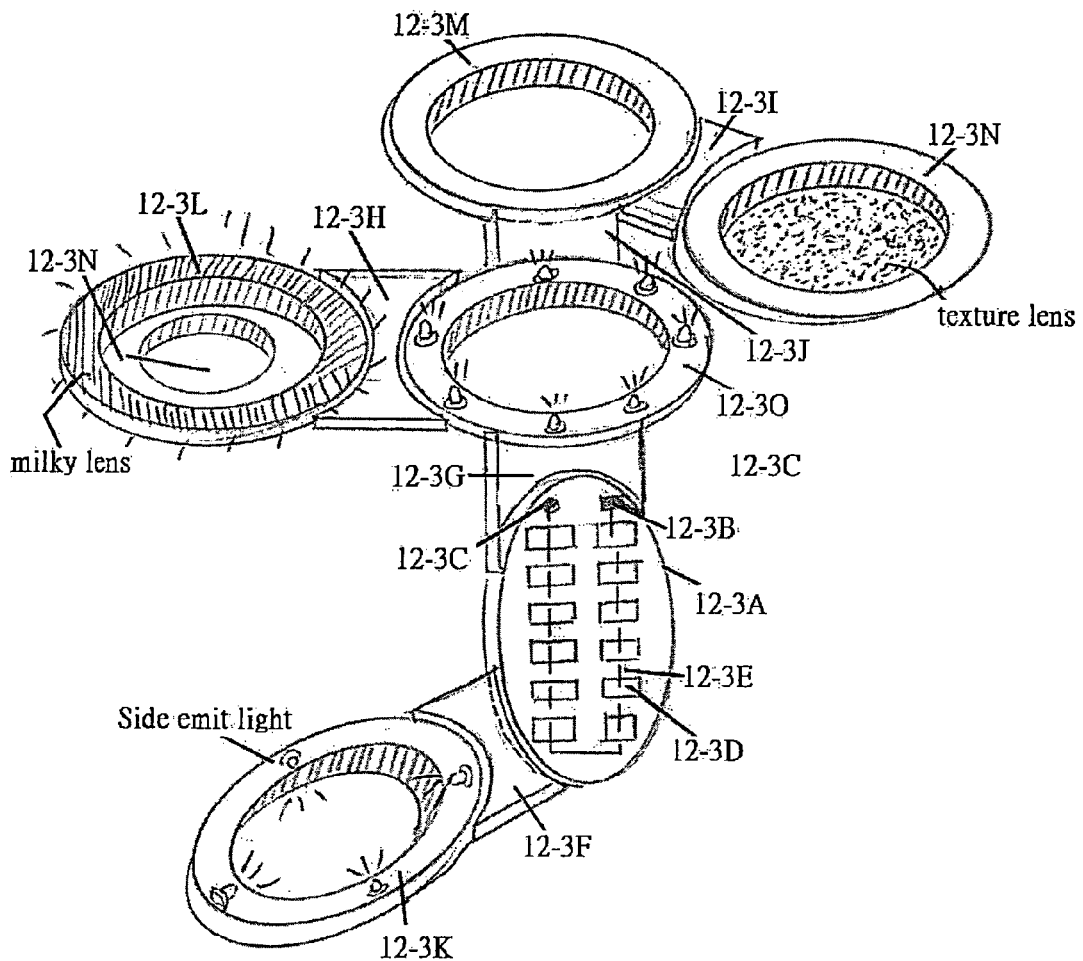

As shown in FIG. 2), the multiple LEDs light device (200) has a top cover (1) with, preferably, three holes (19A) (19B) (19C) to allow three LED-Units to fit into the three holes. Each LED-unit has a lens (11), reflective housing (12), extended poles (13), and help-means (14) to enable each LED-unit to be installed on the track (16) and rotate horizontally with respect to the cover surface (the x-axis) a certain number of degrees to the right or left until it hits a stopper (15).

The two extended-poles (13) allow the LED-unit to swivel vertically with respect to the cover surface (the y-axis) a certain number of degrees up or down until the housing (12) hits a stopper of the tray or cover. The housing of the LED-units can both swivel and rotate in the vertical and horizon directions of the cover surface so that each of the LED-units can emit the inner LED's light beam in any desired direction.

As shown in FIG. 2, tray (2) has a track construction (16) that allows the extended-poles (13) to fit to provide a swivel function. The number of tracks will depend on market requirements and therefore is not limited to three as illustrated in the current preferred embodiment. The tracks can be any number and size to match the LED-unit size. The LED-unit size can be very small, around 3 mm or 5 mm, or 10 mm or larger, or smaller, depending on marketing requirements. It will be appreciated that the plurality of LED-units and its track-construction can be arranged in any arrangement such as 100 pieces vertical and 100 pieces horizontal, which spacing can be any distance. The scope of the current invention is such that the LED-units can be in an array arrangement in to form a desired geometric surface in variety of dimensions with a desired number of LED-units. For example, the LED-units can be arranged as shown in FIG. 3-B to form a rod-shaped (31A) (31B) surface and each of the LED-units (400) with extended-poles (13U) (13V) arranged to fit into the groove (32) so as to provide a certain quantity of similar LED-Units (400) on the rod-shape surface to obtain a good multiple LEDs light device with adjustable angle features in an elongated or linear shape for cabinet light fixtures that can be installed anywhere. Hence, the number of the LED-units, the arrangement of the LED-units, and the geometric shape of the surface of light device is also variable and may depend on market requirements, so that it will be appreciated that all these variable details still fall within the current invention scope of the claims, as will any alternative or equivalent methods.

As shown in FIG. 2, the help-means (14) may have a round nut-shape which can be fitted on the end of the extended-poles (13) and is like a fine surface tire to make the extended-poles (13) move much more smoothly on the track (16). This is an optional means for the current invention. The help-means also can be a nut-shape but with gear-teeth on the outside so that it can make a clinking sound during rotation and achieve precise movement because of the teeth construction on the nut-edge. There are a variety of constructions that can be used to make the extended-poles move on the track with miniaturization techniques known from the marketplace and which will still fall within the current invention scope.

As shown in FIG. 2, the cover (1) and tray (2) are assembled together by conventional assembly means so the LED-units can be well installed and freely adjustable through any desired angles. Each LED (not shown) has its electric-means to connect with the circuit board (17) to provide each LED with functions predetermined by a market available circuit which may be selected from the group consisting of on, off, sequential, flashing, random, pair-flash, fade-in and fade-out, and/or chasing functions, or any light performance which can be driven by electric signals from the circuit or an integrated circuit (I.C.), all of which still fall within the scope of the invention. The circuit board may further incorporate switch-means which may selected from switch means such as a manual switch, photo sensor, other sensor means, moisture sensor, fire sensor, heat sensor, metal sensor, electric sensor or mechanical sensor, timer, and/or PIR sensor to make the multiple LEDs device have an adjustable angle function that can be turned on and off under predetermined conditions and duration. Circuit (17) connects with the desired power source (18) which may be in different voltage and current form. The circuit (17) can connect with a 110V, 60 Hz home electricity system or a direct current system as long as the circuit (17) can offer the LED the correct current specification from the selected power source (whether an AC or DC type). This means the circuit can be designed for a DC power source or can be another design which can work with a AC power source. All these circuits are available from the marketplace so we do not discuss here. As shown in FIG. 2, the preferred embodiment is a DC (direct current) power source in the form of a battery-set. The battery set can supply a desired working voltage and capacity depending on the LED's specification. Some LEDs can be turned on by lower voltage such as 1.68V DC, while some LED need the higher voltage such as 4.5V so the working voltage will vary according to the LED's specifications. The LED's color and its construction will determine the final design for the battery-set's number and capacity so any alternative specification will still fall within the current invention scope. As for the first embodiment, the battery-set includes three 1.5V batteries in series to drive white color LEDs. Alternative battery-sets and different electric connections for a different number of batteries will still fall within the current invention scope.

As shown in FIG. 2, the battery compartment (3) has a plurality of the battery-set (18) and circuit (17) fitted within. The circuit (17) has conductive-means to build an electric connection to deliver electric signals from a power source (18) (such as the preferred battery-set) to the plurality of LEDs. An optional electric-component, electric-device, mechanical-device, switch-means, timer-device, sensor-device, and/or IC may added between to provide required functions and light effects. The battery-compartment (3) includes attachment means (22) or (23) or other phone-hook device (not shown here), double-side tape, foam-tape, glue, or other equivalent attachment-means on an attachment-base (4) to cover the battery-compartment (3) and allow people to install the multiple LEDs light device on a desired surface.

As shown in FIG. 3, tray (302) of the illustrated preferred embodiment has three holes to receive three LED-units (301) (302) (303). Each LED-unit (301) (302) (303) has its track (16W) and the its extended-poles (14W) that fit on the respected track (16W) with a stopper (S1) (S2) to cause the LED-units (301) (302) (303) to have a vertical swivel up to 180 degrees (V180) and horizontal rotation up to 180 degrees (R180). The center of the tray (300) has one opening or window (6AW) to allow the switch-means (6W) to be activated through the opening (6AW) or the window. If an opening, the switch-means should be up the surface. If a window, the switch-means should be lower than the surface. The market place has a lot of different switch-means that can be selected for certain applications.

Figures 4, 12:
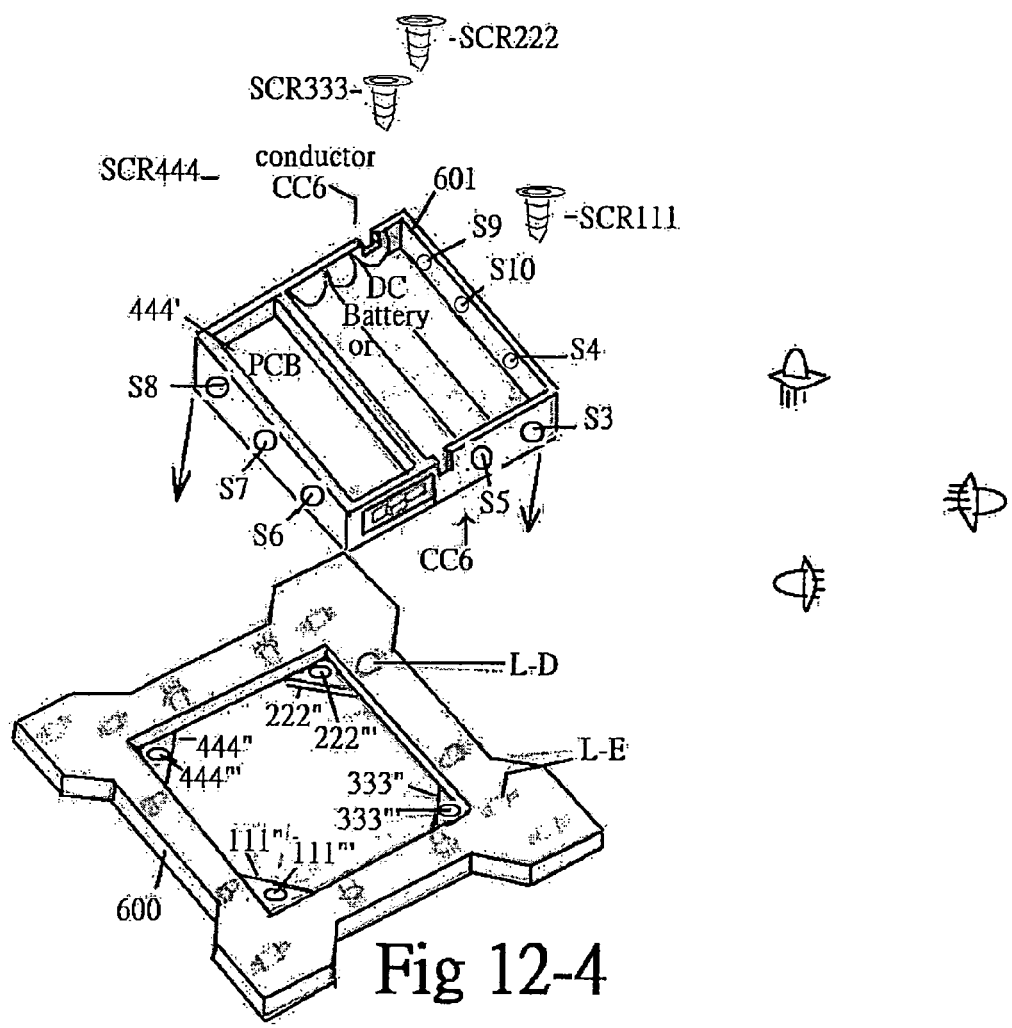
FIG. 4 more details of the construction of the first preferred embodiment.

FIG. 4 show more details of the construction for the embodiments of FIGS. 1, 2, and 3. There is no need to discuss more details of the detailed construction. It will be appreciated that all alternative, replaceable, or equivalent functions of any parts discussed above should still fall within the current invention's scope.

As shown in FIG. 1 to FIG. 4, all drawings disclose arrangement to make the LED-units rotate and tilt or swivel along the track. However, alternative arrangements, treatments, designs, methods, skills will still fall within the current invention scope.

Figures 1, 9:
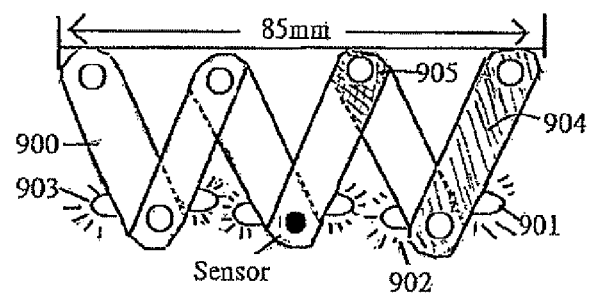

FIG. 5 shows an electric connection arrangement for the changeable geometric system of FIG. 9, FIG. 10, and FIG. 11, which has two same size lower position joint-means (1800) and a top position housing-unit (1801) which has at least a first set of conductive resilient means (spring 1) connected between a first set of the linear-conductive means (1803), one surface (804) and one set of the circle-conductive means (1807')(1807'') (1807''')(1807'''') at the lower surface (1808') to change the linear-conductive means (1803) in-parallel position to the circle-conductive means (1808) in-diameter circle relation. The circle-conductive means (1807')(1807'') (1807''')(1807'''') can use four metal conductive plates or a conventionally available printed circuit board (hereafter PCB) made of a rigid or flexible material with two surface conductors to obtain an equivalent or same function arrangement. Similarly, the linear-conductive means (1803) may use four conductive metal wires for installation within the housing-unit or joint-means or one can use a simple PCB with four traces to provide an equivalent or same function arrangement. Hence, the conductive means should not limited to the preferred embodiment and drawing, and all same, equivalent, or alternative skill or method should still fall within the scope of the current invention.

A second set of conductive resilient means (spring 2) contacts the circle-conductive means (1808) on the upper surface (1808'') and the second set of linear-conductive means (1803') on one surface to change the circle-conductive means (1808) in-diameter circle relation to the linear-conductive means (1803') in-parallel position. The electric signal delivery from the first linear-conductive means (1803) passes through the first set of conductive resilient means (Spring1), then passes though the circle-conductive means (1808) lower surface (1808') and upper surface (1808''), and then passes through the second conductive resilient means (Spring2) to the second set of linear-conductive means (1803') to deliver an electric signal from the first linear (1803) conductive means to the second linear (1803') conductive means.

The first housing-unit (1800) of the LED light with changeable geometric system has a first linear conductive means (1803), first conductive resilient means (Spring1), and circuit-conductive means (1808) within a first housing-unit (1800) body.

The second housing unit (1801) of the LED light with changeable geometric system has a linear conductive means (1803') and second conductive resilient means (Spring2) within a second housing-unit (1801) body.

The electric signal can be delivered from the first housing-unit (1800) to the second housing-unit (1801) while the two housing-units (1800) (1801) are in contact with a correct alignment for the first linear (1803) resilient (Spring1) and circle (1808) conductive means and the second resilient (Spring2) and second linear conductive means (1803') to cause the at least one LED (LED-1) or LED-unit (not shown) to provide illumination according to a pre-determined function, the circuits optionally incorporating desired electric components, switch means, sensor means, timer means, an I.C., and/or an A.C. or D.C. power source.

At least one joint-means may be included to make the assembly of the first housing-unit and second housing-unit tight and can be rotated a certain degree angle to provide a changeable geometric system for the LED light.

An alternative or equivalent function can use the quick connector sets (1888) (18889) (1889') to deliver electricity from the lower joint-means to the top housing-unit's LEDs or LED-units. To connect the lower joint-means one can use a mother-board (1888) which has two top and lower quick connectors (1888') (1888'') to connect the top one-to-three four conductive-wire quick connector set (1889). The one-to-three four conductive-wire quick connector set can be any number from one-to-N with N conductive-wires to meet different requirements. The mother board (1888) lower connector (1888'') is also connected with the preferred one-to-three four conductive-wire quick connector set and installed within the lower joint-means for delivering the electric signal. It will be appreciated that the lower quick connector set may also be one-to-one so that it can simply deliver the electric signal within the lower joint-means, unlike the top level housing-unit which has to be connected with a plurality of LEDs or LED-units to achieve a preferred light function. The LEDs or LED-unit can connect with each quick connector or the LEDs or LED-unit's base can be provided with a special arrangement which can connect with the quick connector having a corresponding connector base design. In this example, the electricity delivery between all housing-units or joint-means can use any available electric components or parts, or all kind of conductive means including a wire, spring, metal piece, PCB, quickly connectors set, conductive rubber, resilient means, and/or ITO, which can deliver the electric signal in the same manner as disclosed inventor's earlier U.S. patents for electroluminescent application). Hence, it is to be appreciated that all these electric delivery methods, skills, procedure, arrangements, designs, and/or technical solutions still should fall within the current invention scope.

FIG. 5-1, shows procedures to make the housing-unit or joint-means in the most economic way. First a conductive wires' set (810) having a plurality of ditches to allow conductive-wires (1811) to be installed within is injected. After the conductive-wires are installed in the first injected part, the injection machine is used to make a second injection part (1812) having desire locations (1816) (1816') (1816") to install the conductive means (case 1 or case 2) to supply an electric signal to desired points. The outside shape of the housing-unit (1812) or joint-means (1812) allows a surface-plate (1813 or 1814) to fit on to the outer shape of the housing-unit or joint-means (1812) at locations (1817) (1817') (1817") (1819) (1819') to install the recess LED-units (1817) (1817') or simple LED lights (1817") or opaque-lenses (1819) (1819') with optics properties to provide fluorescent tube effects using diffusion (not shown). The LED-units (1817) (1817') may, like those of FIGS. 1 to 4, include tilt and 360 degree rotating features.

FIG. 5-2 shows preferred housing-units (H5-2') (H5-2") (H5-2''') and joint-means (J5-2') (J5-2") (J5-2''') for the preferred embodiment of FIG. 9 or FIG. 10. Each of the housing-units and joint-means can be designed identically so that they can be universally assembled into desired pieces and lengths for the LED light. In this embodiment, the housing-unit and joint-means can be designed to have an identical size, shape, dimension, and construction so as to be universal and even while providing different light performances using the simple LEDs, recessed LED-units, or florescent-tube like LED-units.

FIG. 6 shows spring holders (Case 1A) (Case 2A) both having channels (Tube1A) (Tube2A) to allow resilient conductive means (spring1A) (spring2) (spring3A) to fit within and enable the resilient conductive means to supply electricity from one end to the other end. Case 1A has one surface with a conductive metal circle plate (1807'A) (1807"A) (1807'''A) (1807''''A) which can use an equivalent conductive circuit board or PCB as discussed above to change the linear-conductive means to a circle conductive means. The case 2A connects the circle conductive means (PCB or 1817'A, 1817"A, 1817'''A, 1817''''A) to the other linear conductive means (E2A) or LEDs' electric terminals (E1A) which depend on the product specification, and can further be incorporated with a case 3A to make a more satisfactory device.

As shown in FIGS. 5, 5-1, 5-2, and 6, the conductive means arrangement provides an electric signal delivery path that can be changed from linear to circular and circular to linear. This is the preferred embodiment which can create 360 degree rotating features for the products. However, alternative arrangements, treatments, designs, methods, skills will still fall within the current invention scope. For example, in order to provide electricity delivery from any housing-unit or joint-means to others one can also use simple conductive wires to provide the same functions depending on market requirements and safety regulations for different countries and areas.

FIG. 7 shows a third preferred embodiment which is extendable from a short length of 50 mm to, preferably, a length of 320 mm. The length is extendable almost 6.4 times. This LED light device can change in a number of ways, such as: (a) the LED relative position with other LEDs can be changed; (b) the device shape can be changed: (c) the light emitting direction, position, and areas can be changed; and/or (d) the LED's number also can be changed. The current invention's preferred embodiment with extendable features may incorporate conventional flexible means selected from a rivet, hinge, chain, screw, metal parts, plastic parts, rings, rotating means, snap means, hook means, cover means, press-tight means from the convention market and traditional skill in the art, but is not limited thereto. It also can use equivalent methods to get the same function to make the light device extendable to change the size, dimension, and geometric configuration. It will also be appreciated that each housing-unit may have different dimensions or configuration, including length, width, thickness, shape, geometric design, finish, and markings, so as not to limited to one size. It can be very small for infant toy use or big up to "China Great Wall" size. The current invention also can have a desired size as long as it has proper dimensions for each housing-unit so as to easily get desired features to use for all different spaces where human beings stay, including indoors and outdoors.

The preferred embodiments are just simple examples of with single dimension from a folded state to an extended state from a 50 mm to a 320 mm range. It can be smaller or up to kilometers or miles in size.

FIGS. 7 and 8, also show extendable features that make the conventional LED light device become a universal light device to allow a consumer to install it in more locations with less limitations. The LED light device as discussed above may be incorporated with sensor means selected from the group including mechanical or electrical sensors such as a photo sensor, motion sensor, timer, manual switch, humidity sensor, smoke sensor, heating sensor, magnetic sensor, or tilt sensor.

As shown in FIG. 7, LED light device (700) includes top grill house-unit (708) and the lower grill house-unit (701). The power source may be an alternating current power source or a battery power source depending on marketing requirements. The top house-units (708) may have a desired number of LEDs installed therein. Each top house-unit (708) and lower house-unit (701) may be connected by conventional electric conductive means including conductive resilient means, and/or a conductive metal spring, conductive metal ring, conductive wire, and/or conductive metal piece to deliver electricity from the power source end (+) (−) of the first house-unit to the last house-unit and to connect all the LEDs as desired in-series or in-parallel to meet marketing requirements.

It will be appreciated that the current LED light device may be incorporated with sensor means (702) such as a motion sensor or photo sensor when the power source is a battery to save power. The light device also can incorporate another type of sensor or switch as discussed above. For even more practicality, some locations (703), (704), (705) may include a hole with rotatable features to install hooks, posts, bars, and/or other electric devices to provide the LED light device with more functions than just a light device. These additional holes can allow people to hang a cloth, jacket, hat, cap, bag, or even to use the circuit to charge batteries such as those of a communication device, cellular phone device, or other computer device which uses a battery. It is simple just to add one additional circuit to drive a power source and provide an electric signal of an appropriate voltage and current to charge batteries for communication, computing, consumer products.

FIG. 8 shows the same embodiment as FIG. 7 but the LED light device been extended to longer length, from FIG. 7's length of 50 mm to FIG. 8's length of 320 mm. Each joint point for joining the lower house-unit with the top house-unit may use conventionally available flexible means as discussed above.

The LED light device (800) has attachment means selected from glue, double-side tape, foam tape (804), hook and loop tape, chemical adhesive material, screws(805) (806), phone hook and catch (809) (809'), holes (807) (808), rivets or a hold tray with attachment means.

As shown in FIG. 8, some of the flexible joint points (801) where preferable do not have an LED-unit installed at the location and just use a rivet or equivalent-function flexible means so that it can be incorporated with a pole, hook (802) or other metal or plastic device to allow the LED light device to offer another function such as hanging a cloth, cap, hat, or bag. The added function can also be provided by an electric device or non-electric device to extend the function of the extendable LED light device.

As shown in FIG. 8, the sensor means as discussed above may be a mechanical or electrical type sensor selected from a photo sensor, motion sensor, timer, manual switch, humidity sensor, smoke sensor, heating sensor, magnetic sensor, or tilt sensor.

FIGS. 9, 9-1, 10, and 10-1, show an LED light device with flexible means of a fourth preferred embodiment which has foldable or flexible changing features. FIG. 10 shows the light device extended to 155 mm while FIG. 9 shows a folded length of 85 mm. The flexible means may be selected from a hinge (1002) (1006), rivet (1003), special screw (1004), or nuts (1005) as discussed above but is not limited thereto since any equivalent metal or plastic means offering flexible or folded properties of the housing-unit (1000) or joint-means (1011) may be substituted. The LED-unit (1001) may use the angle adjustment of the first and second preferred embodiments, which allows the LED-unit to have an adjustable angle and emit an LED light beam to desired locations. The embodiments discussed above allow the LED light beam to be adjusted on x, y, and z axes as desired. The LEDs or LED-units shown in FIG. 9-1 and FIG. 10-1 include light areas (1010), (904), and (905) which provide an area light performance to make the LEDs or LED-unit shine inside the housing-unit (1000) or joint-means (1011) through an opaque or milky plastic material of the housing-unit or joint-means to achieve portion illumination (905) or whole piece illumination (1010) (904). As shown in FIG. 10, a sensor means (sensor) may be applied to the preferred embodiment when the power source (not shown) is a battery so as to provide good power saving, by using a motion sensor, photo sensor, or any combination of a conventional market-available switch and sensor means. The sensor means also can offer great convenience to people so it can added even using a power source such as home electricity, a solar module, chemical power, or other type of power. The recessed LED-unit (1007) can fit within a housing-unit (1000) or joint-means (1011) with tilt and 360 degree rotation functions to allow more practicality for the consumer. The up-grade design for the fluorescent value LED light (1009) also can be arranged within the housing-unit (1000) or joint-means (1011). The alternative grilled appearance of the fluorescent-light (1008) may also be considered to meet market requirements. When used for outdoor application the light device of the invention must be arranged to deal with environment, humidity, moisture, waterproofing, and anti-violet ray issues so as avoid damage due to hard sunshine, sprinkler, rain, snow, and other weather and cloudy days. The current invention may be installed on the ground, a wall, under a cabinet, or on a surface of a garage, floor, mud, street, trail, rack, or any other surface where one can use conventional available attachment means to install the current invention and meet all safety requirements. The solar cells are sealed within a chemical compound or vacuum film or other treatment also available from the conventional marketplace. The solar cell can use single crystal, multiple crystal or non-crystal types depending on design requirements. To make housing-units and joint-means with an environment grade to work properly under heavy snow, hard sunshine, heavy humidity, storms, rainy seasons, or floods can be achieved by available skill without any problem to enable the electric system to function normally under any weather conditions.

As shown in FIGS. 11, 11-1, 11-2, and 11-3, the fourth preferred embodiment of the current invention has the changeable geometric dimension features to make the LEDs' or LED-units' position, orientation, or light emitting angle changeable with respect to those of other LEDs or LED-units respectively. FIG. 11 shows a retractable LED light which can be extended and retracted to fit into different spaces for different lengths of the LED light. Four LED-units are installed at the center position of each housing-unit (H 11)(H 11') (H 11") (H 11'"). Fluorescent light effects can be obtained by using an optics lens (FL 1) (FL 2) (FL 3) (FL 4) (FL 5) in front of the inside LEDs, which may be installed on the lower level joint-means (J11 A) (J11 A') (J11 A") (J11 A'"). The LEDs or LED-units can be installed within the housing-unit or joint-means as desired.

FIG. 11-1 shows a different arrangement of LEDs or an LED-unit having a different light appearance installed within the housing-unit or joint-means. The different light appearance may be selected from fluorescent light looking (FL 6), grill light looking (FL 7), convex lens (FL 8), or concave lens (FL 9) to enable the inner LEDs (not shown) to create different accents and value of the light performance. The multiple sets of the housing-units and joint-means can be connected by conventional conductive means (wire 1 and quick connector means) (wire 2) (wire 3) so that the light device of the invention can cover a large area. Furthermore, an alternative way to make the connection between the multiple LED light devices can use quick connector means to make the electrical connection. It will be appreciated that the inner electric arrangement for the housing-unit and joint-means also can use quick connector means to simplify construction of the light devices of FIGS. 5, 5-1, 6. In addition, other equivalent ways to make the electric arrangement will still fall within the current invention scope. The LED light device can be designed for horizontal installation, vertical installation, or tile installation onto a main object as desired.

As shown in FIGS. 7 and 8, the two sides of the said LED light can have an extended-section (709) (709') which allows with a different shape to connect with two position poles (711) (712) to hold the extended-section's hole (712) (712') in position. The end holes (713) (713') are aligned and connected with the pulling-pole (714) by catcher means (710) so when the puller (711) is moved back and forth the pulling-pole will press the elastic spring (712) and cause the other sides (709") (709'") to close and open. This will make the housing-units and joint-means change position at the same time.

The pulling-pole may be connected with motor means (716) or force-means to cause the two extended-sections (709") (709'") to be pushed toward and away from each other to cause the LED light device to exhibit moving effects, either automatically (motor-means) or manually (by force-means). The other side of the LED light device (709") (709''') will close and open the two discs, allowing the LED light device to incorporate a sound active sensor (not shown) and to obtain moving light effects with color changing and multiple functions such as fade-in and fade-out, sequential flashing, pair flashing, random, chasing, and all kinds of other light show with motion light effects. One can also add an extra pole (809"), plate (809'''), hook (801), telephone holes (809) (809') or other bar, hanger, string, wire, and/or rack to allow people to hang a spoon, kitchen ware, brush, cloth, hat, cap, glove, clipper, wine, mug, other items on the LED light device with desire LEDs or LED-units for illumination.

It will also be appreciated that the LED light device of this preferred embodiment can be any size, for example 3", 6", 1', 2' or any size, shape, or dimension to allow it to fit into a certain area in, for example, transportation equipment, a car, van, house, room, living room, kitchen, outdoor, solar fence, solar barricade, solar delineator, solar warning light, solar pavement light, solar wall, solar divider, solar pathway light, solar garden light, solar roof light, solar patio light, solar pool light, solar divider for garden, solar construction zone light, solar dangerous warning light, or solar police warning light, so the LED light device can have a variety of sizes to fit a variety of applications for both indoors and outdoors.

As shown in FIGS. 11-2 and 11-3, the LEDs or LED-units may be installed within the housing-unit or joint-means with conventional LEDs in sealed units having diameters of, for example, 3 mm (L 11-3), 5 mm (L 11-3'), 10 mm (L 11-3") or an alternative shape, length, shape, color, electrode number, and so forth. The LEDs can also be in chip (D 11-2'), dice (D 11-2), or other form or specification. In addition, the LED package (not shown) can have a dot-matrix array arrangement to pass a message to viewers.

As shown in FIGS. 11, 11-1, 11-2, and 11-3, the LED light device with changeable geometric dimension function includes at least one LED installed within a housing-unit or joint-means in any of the x, y, and z axes and the said housing-units are connected by at least one of the joint-means to deliver electric signals from a power source to desired LEDs, through, for example, an integrated circuit, circuit means, switch means, sensor means, and/or conductive means for illumination under a pre-determined light performance. The LED light device's geometric dimension will be changed whenever any variation is applied to the original housing-unit or joint-means. The LED light device may incorporate conventional attachment means to install on any main object. FIG. 11 shows that the housing-units (H11 A) (H11 A') (H11 A") (H11 A''') are connected by same size joint-means (J11 A) (J11 A') (J11 A") (J11 A'''). The housing-units (H11 A) (H11 A') (H11 A") (H11 A''') or joint-means (J11 A) (J11 A') (311 A") (311 A''') have LEDs installed anywhere at desire locations along any three-dimensional axis. The LED number can be 1 piece to N piece (N=any number). The same joint-means (J11 A) (J11 A') (J11 A") (J11 A''') have LEDs installed anywhere at desired locations along the three axes. The LED number can be 1 piece to N pieces (N=any number). The power source (not shown) can be in the form of an alternating current or direct current source having batteries charged by solar module, charger, wind power generator or other generator available in the marketplace, scientific field, or known to physics, and which may incorporate circuit means, conductive means, sensor means, switch means, and/or electric components selected from convention market available units to deliver the electric signals from the power source to desired LEDs. The D.C. power source can be installed within a housing-unit or joint-means' compartment because LED power consumption is very small and only a simple circuit is required. The A.C. power source may have the circuit means, switch means, sensor means, conductive means, wire means, quick connector means, and/or a plug arranged in a proper space, room, or compartments of the light device. In the current preferred embodiment, the wire and plug can be arranged to fit into the compartment of the joint-means to supply the A.C. current to the LED light device.

A proper design of the housing-unit and joint-means with respect to size and dimension can allow the D.C. power source kits or the A.C. power source kits to be arranged to have the best cosmetic appearance and a nice net value.

A proper surface texture, printing, or treatment to achieve a desired finish such as wooden, marlboro, mosaic, brick, glass, metalized, enameled vitreous brick, or glazement tile, can make the best value of the LED light kits.

FIGS. 7, 8, 9, 10, 11, 11-1, 11-2, 11-3, all show a preferred embodiment with a preferred arrangement for an extendable housing-unit and joint-means, preferably with conductive means to provide electric signal delivery from power source to the LEDs or LED-units. However, alternative arrangements, treatments, designs, methods, or skills still fall within the scope of the current invention.

FIG. 12 shows an LED light device with a changeable geometric dimension/system and a preferred power source. The LED light device (12 A) (12 B) (12 C) (12 C') (12 D) (12 D') (12 E) (12 F) (12 F') has changeable properties including geometric shape and dimension using means that are: rotary, jumpable gap, extendable, foldable, distance, extractable, connectable, disconnectable, retractable, expendable, addable, adjustable, bendable, overlappable, underlayable, assembleable, disassembleable, and/or flexible.

The LED light device (12A) has foldable, addable, disconnectable, or bendable properties for providing a garage door with desired LED illumination when connected with a home electricity power source.

The LED light devices (12 B) (12 C) (12 C') (12 C")(12 E)(12 F) (12 F') correspond to those discussed above with respect to FIGS. 9, 10, 11, 114, 11-2, and 11-3, which have extendable, retractable properties for use in an outdoor road construction zone, fence, wall, door, garden decoration fence, divider, pathway guide, wall decoration, hanging rack for a kitchen, or garage with desired light illumination. These outdoor lights can be powered by rechargeable batteries charged by a solar module (12 S1) (12 S2) (12 S3) (12 S4) and incorporated with sensor means to turn on the d LED light device at a predetermined darkness level and to turn off automatically when the environment reaches a predetermined brightness.

The LED light device (12 B) and (12 C") can be connected with home electricity power and incorporated with the sensor means so as turn on and off according to a predetermined function and obtain desired illumination.

The LED light device (12 F) and (12 F') is designed for a road construction zone where a warning light is needed to be seen by drivers and pedestrians. The extendable and retractable function offers easy storage in a working car and extension to a certain length to offer divider and warning light functions. Incorporation of a solar power source and batteries for use in cloudy weather provides excellent results for this kind of device. Door, fence or pathway illumination can use the LED light device (12 C) (12 C') (12 C") (12 E), which also may be powered by rechargeable batteries and charged by a solar module. The LED light device of the above discussion may incorporate an IC and related circuit means, sensor means, timer means, switch means to provide the LEDs or LED-units with different colors, light brightness, or light photometric arrangement to exhibit all kinds of light show and performances to meet market requirements. The current invention may be installed on the ground, a wall, under a cabinet, or in a garage, floor, mud, street, trail, rack, or other surface using conventionally available attachment means to install the current invention well and meet all safety requirements. The solar cells are sealed within the chemical compound, vacuum film, or other treatment also available from the conventional marketplace. The solar cell can use single crystal, multiple crystal or non-crystal types of solar cell according to design requirements. To make the housing-units and joint-means work properly under heavy snow, hard sunshine, heavy humidity, storms, rainy season, and/or flood, any available skill may be used without any problem to keep the electric system operating according to the normal weather condition standard. The multiple sets of the housing-units and joint-means can be connected by conventional conductive means (wire 1) (wire 2) (wire 3) to encompass a big area. On each set of the LED light device with changeable geometric dimension or system of the current invention, the two sides of the LED light can have another shape extended-section (not shown) which allows connection with motor means or force-means to cause the two extended-section to be pushed to and from each other and provide the LED light device with moving effects, either automatically (motor-means) or manually (by force-means). It will be appreciated that the LED light device of this preferred embodiment can use any size for the housing-unit and joint-means, for example for 3", 6", 1', and 2' or any other size, shape, or dimension to allow it to fit into a certain area, such as in transportation equipment, a car, van, house, room, living room, kitchen, outdoor, solar fence, solar barricade, solar delineator, solar warning light, solar pavement light, solar wall, solar divider, solar pathway light, solar garden light, solar roof light, solar patio light, solar pool light, and/or solar divider for garden, solar construction zone light, solar hazard warning light, and/or solar police warning light, so the LED light device can assume a variety of sizes to fit a variety applications for indoors and outdoors.

The LED light device (12 G) and (12 H) are powered by a solar module (12 S5) (12 S6) with a geometric system corresponding to the one disclosed in the copending application entitled "LED light device with changeable geometric system filed on Jan. 7, 2008). The LED light devices (12 D) and (12 D') are powered by the solar module (12 S8) and (12 S7) for outdoor tiles to let people step on or make garden decoration. Each tile is connected with the power source and provides illumination when a predetermined environmental darkness occurs. The illumination performance can be a spot-light, area-light, circle light, or exhibit a desired message such as (S)(*)(Triangle) (Square) (L) (I) (T) (E) or circle shape light. The solar module (12 S7) (12 S8) can be arranged and designed to have a shape that is the same as that of the other housing-units.

FIG. 12-1 shows one of the preferred solar modules (12-1 A) which has solar cells cut to a certain size and connect in-series and in-parallel to get the desire output of the voltage and current so that one can charge the rechargeable batteries. The solar module output voltage is normally higher than the batteries voltage so as to charge the rechargeable batteries. However, this normal way to design a solar module is too costly. The alternative and lower cost method is to have the solar module output voltage be much lower than the rechargeable batteries' voltage. In order to supply a higher input voltage to batteries, cheap electric components such as an inductor or transformer can be added to kick the solar module output voltage up to much higher voltage level to overcome the batteries' voltage level and charge batteries easily. The solar module (12-1 D) has a predetermined solar cell arrangement with environment sealing and two arms (12-1 B) and (12-1 C) that allow the solar module to be rotated so that the solar module can be installed at a perfect location.

As shown in FIG. 12-2, the solar module (12-2 C) is connected with a changeable geometric system which includes housing-units (12-2 E) (12-2 F) (12-2 H) (12-2 M) and joint-means (12-2 J) (12-2 K) (12-2 L), and which is powered by a common power source (not shown) charged by solar module (12-2 D) to cause the LEDs (12-2 P) and LED-unit (12-2 G) to illuminate.

As shown in FIG. 12-3, the geometric shape changeable housing-units (12-3 A) (12-3 K) (12-3 L) (12-3 M) (12-3 N)(12-3 O) are connected by the joint-means (12-3 F) (12-3 G) (12-3 H) (12-3 I) (12-3 J). The housing-unit (12-3 A) is a solar module which has plurality of solar cells (12-3 D) arranged within and two output terminals (12-3 B) and (12-3 C)

As shown in FIG. 12-4, housing-unit (600) has a plurality of desired specification LEDs (L-D) (L-E) in different form installed on the housing-unit. The preferred power pack (601) can be fixed on the housing-unit (600) by a screw (SCR 111) (SCR222) (SCR333)(SCR444) passing thought the power pack (601) holes and hold-means holes (111") (222") (333") (444") of a hold-means (111''') (222''')(333''') (444'''). The power pack (601) can load batteries (for D.C.), a plug and wire (for A.C.), switch means (S6) (S7) (S8), sensor means (S3) (S4), and/or timer-means (59) (S10) selected from conventional market available models to obtain desired light functions. The extra space (444') can accommodate any circuit means, printed circuit board (PCB), or big electric components within. The power pack (601) can fit a plurality of rechargeable batteries (not shown) charged by a solar module optionally incorporated with a voltage kick-up circuit as discussed above, which may be selected from an inductor, transformer, or equivalent electric components to raise the lower solar module output voltage to much higher than the batteries' voltage levels so that the batteries can easily be charged by the lower output voltage of the solar module.

Figure 13:
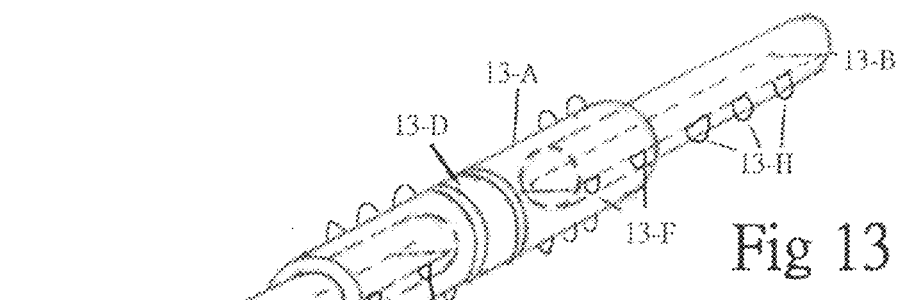
FIG. 13 shows a preferred extendable and retractable embodiment in which the positions of LEDs or LED-units is changeable with respect to the positions of other LEDs or LED-units.
Figures 1, 13:
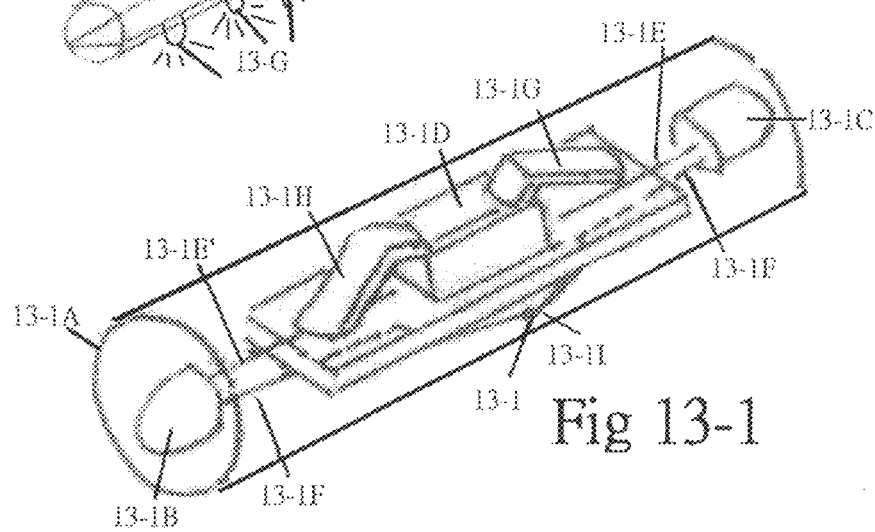
Figures 2, 13:
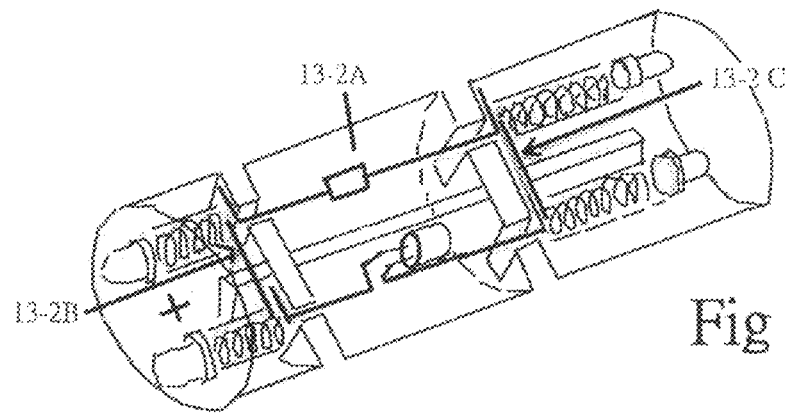
Figures 3, 13:
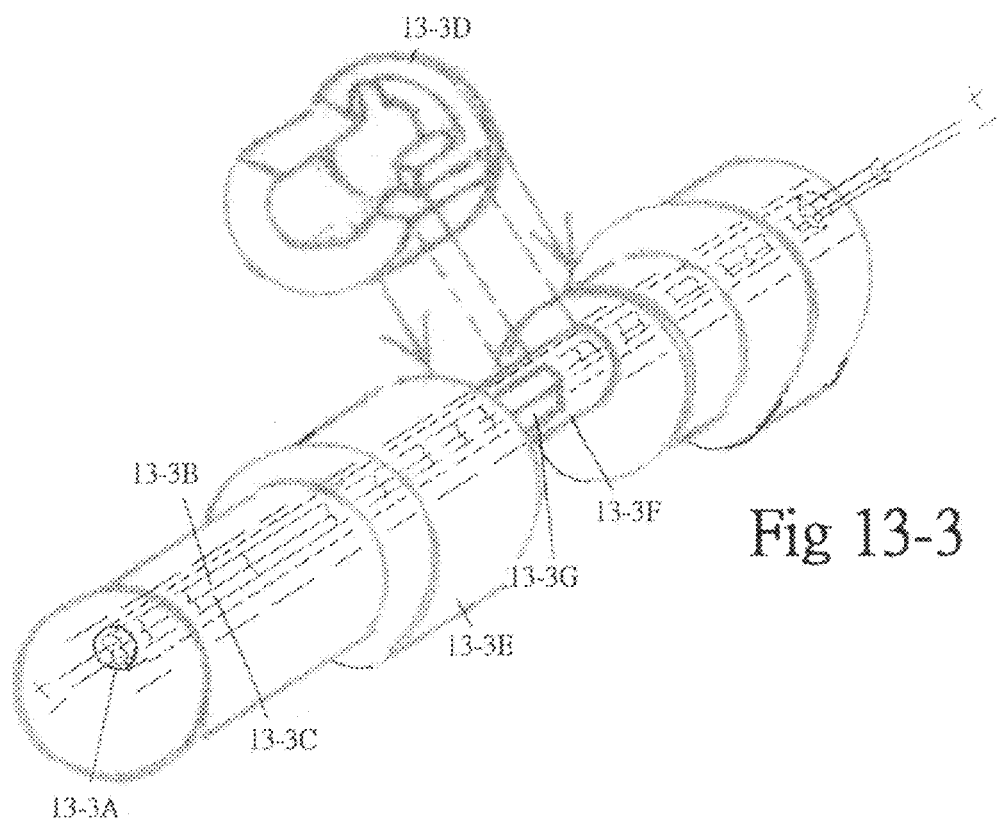

FIGS. 12, 12-1, 12-2, 12-3, and 12-4, show a solar module for charging the rechargeable batteries of the LED light device. In this preferred embodiment, one solar module supplies a plurality of the housing-units or joint-means' LEDs or LED-units, although other arrangements in which a fixed number of the housing-units or joint-means use one solar module may be substituted so as not to waste the over-specification of the solar module, which can supply double a certain number of housing-units or joint-means. The solar module can be designed to be within the housing-unit or joint-means to make a nicer and neater design. The solar module also can have less solar cells to get a lower output voltage when incorporating a voltage kick-up circuit to make the input voltage sufficient to charge the rechargeable batteries with no problem. Other alternative arrangements will also still fall within the current invention scope for an LED light device with changeable features for outdoor application. The LED light device can be used for a solar power barricade light, delineator light, fence light, warning light, or path light on a road. These applications use the same function or equivalent treatment of the current invention. The alternative arrangements, treatments, designs, methods, skills may all fall within the current invention scope. For example, as shown in FIG. 13, the LED light device (13 A) with changeable geometric dimension may have two small inner-light tubes (13 B) and (13 C), each of which has a plurality of LEDs (13 G) (13 H) (13 E) (13 F) or LED-units installed within the elongate length. The inner-light tubes (13 B) (13 C) LEDs (13 H) (13 G) will turn on when the LEDs' are positioned outside the outside-tube's two ends. The inner-light tube (13 B) (13 C) LEDs (13 E) and (13 F) will not turn-on while the LEDs (13 E) (13 F) are inside the outside tube body. The outside tube may have a plurality of LEDs or LED-units installed at a desired location for illumination. The two inner-light tubes (13 B) and (13 C) offer extra LEDs to almost double the outside tube's length for illumination. This extendable and retractable arrangement with automatic turn on and turn off of the LED illumination also saves a lot of power consumption when the LEDs are inside the outside tube body. The inner-light tube can be any shape such as an "L" shape so as to allow people to make illumination for "L" area. It also can have other shapes to enable the extendable two inner-light tubes to be used in certain areas which are not straight. The outer tube also may have a desired LED arrangement along any three-dimensional axis to offer perfect illumination for any area.

The LEDs or LED-units within the elongate housing are not limited to the preferred embodiment illustrated in FIG. 13. It will be appreciated that all alternative or equivalent functions to supply an electric signal from a power source to LEDs or LED-units may still fall within the current invention scope. As shown in FIG. 13-1, the two LEDs (13-1 B) (13-1 C) or LED-units are installed within the elongate housing (13-1 A), and the power source (13-1 D) including batteries (not shown) are located at the center position of the PCB with two LED electrodes (13-1 E') (13-1 E) under the metal conductive means (13-1 H) (13-1 G) and the other LED electrodes (13-1 F') and (13-1 F) connected with power source (13-1 D). The LEDs (13-1 B) (13-1 C) will turn on when the conductive metal means (13-1 G) (13-1 H) have been pushed and connected with the LED's electrodes (13-1 E') and (13-1 E).

Figure 14:
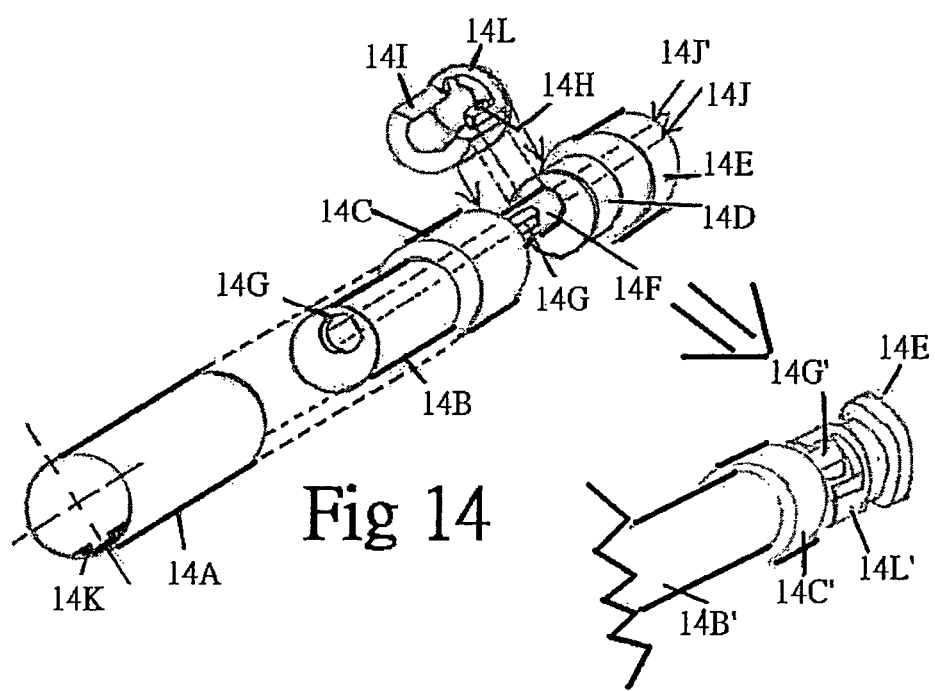
FIG. 14 shows a lock-and-release means for a fifth preferred embodiment which enables lock and release of an inner bar to the outside bar at any location along the elongate body of the outside bar.

As shown in FIGS. 13-2 and FIG. 13-3, each of two contact-bars on one end of the joint means are connected together by conductive means (13-2B) (13-2C) so that each contact bar on each end will have the same electric polarization. FIG. 13-3 shows a lock-and-release means (13-3 E) (13-3D) with channel (13-3 A) to allow the conductive means (13-3 B) and (13-3 C) to passing though and connected with the inner-light tube's LEDs or LED-units for illumination. The conductive means (13-3 B) (13-3 C) at the center location of the two-way retractable conductive means are connected to the said power source to cause illumination of the LEDs or LED-units. FIG. 14 shows a preferred lock-and-release kit construction for the light device of FIG. 13. Two of the inner-light tubes can be extended outward off center for a desired length and all of the LEDs or LED-units on the inner-light tube can turn on while the said LED or LED-units can be seen by viewer. The rest of the LEDs or LED-units will not turn on because they are still inside the outer-tube. When the entire inner-light tube is pushed into the outer tube, all LEDs or LED-units on the inner-light tube will be turned off because all of these LEDs and LED-units are inside the outer-tube. The lock-and-release means will then fall within the outer-tube body to provide the lock and release function for the inner-light tube and outer tube.

As shown in FIG. 14, the inside end of the inner-light tube (14A) has one lock-and-release set (14B) (14L) to cause the inner-light tube (14A) to lock and release the outside tube. One part of the set (14B) can be inserted into the inner-light tube (14A) and fixed tightly to prevent any movement. One portion (14F) of the lock-and-release set is narrower than the rest of set, the diameter from (14C) to the end (14F) being the same. The narrow portion has an off-center pole (14F) and raised-stopper (14G) to block the twist-deforming unit (14L) to cause the twist-deforming unit (14L) to deform when the inner-light tube is rotated counter clockwise with respect to the outside tube. To enable counter clockwise rotation, the inner-light tube must have sufficient material (14L) deform and scratch the outside tube inner surface to stop and lock the inner-tube and outside tube tightly. Upon clockwise rotation, the deformed sufficient material (14L) will be restored to its original position to release the inner tube and outside tube and enable the inner-light tube to freely move within the outside tube again. It is to be appreciated that all alternative or equivalent ways to make the inner-light tube lock-and-release with respect to the outside tube may still fall within the scope of the current invention.

Figures 1, 15:
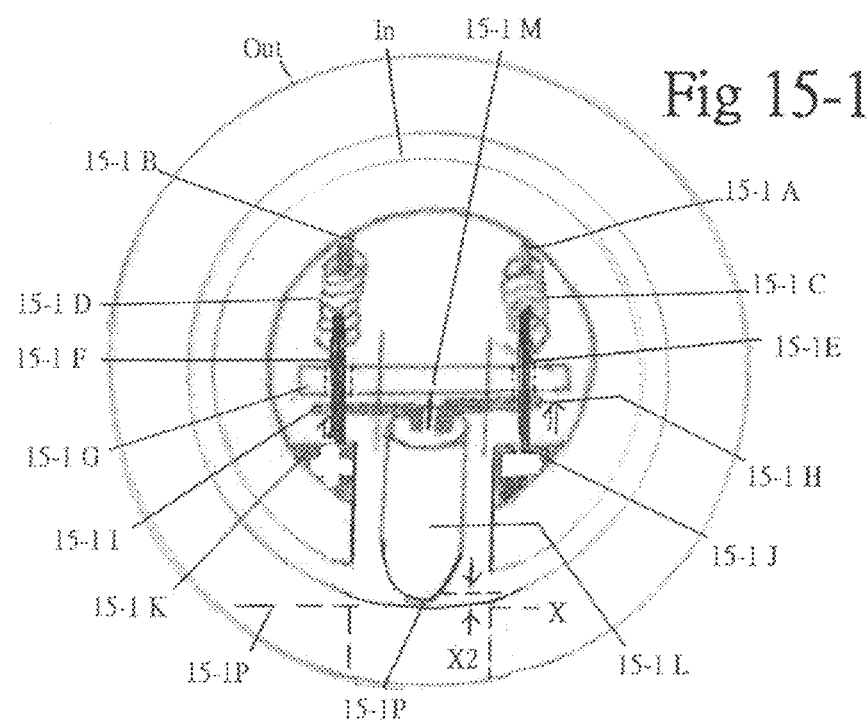
Figures 2, 15:
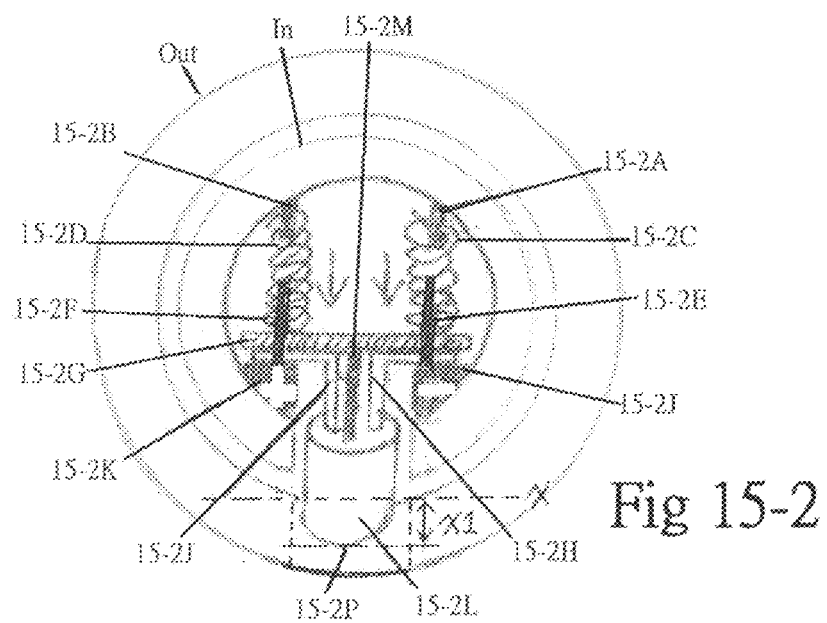

As shown in FIGS. 15-1 and 15-2, the LEDs (15-1 L) (15-2 L) will be turned-on and turned-off automatically within the inner-light tube (IN). The inner-light tube (IN) has a hole to allow the LEDs (15-1 L) (15-2 L) to be freely moved within the hole. The two sides (15-1 J) and (15-1 K) of the hole have electric-signal contact-areas such as (−) (+) to allow the LED's two electrodes to contact with the contact-areas to enable electric-signal delivery from the power source (not shown) through the contact-areas to the LED's two electrodes. The two pairs of isolating-poles (15-1 B) (15-1 F) and (15-1 A) (15-1 E) are located on the inner-light tube (IN) parallel with the hole's channel to install the PCB (15-1 G) which holds the LED (15-1 L) and its two electrodes (15-1 I) and (15-1 H). Conductive resilient means (15-1 D) and (15-1 C) are installed between each pair of the isolating-poles to provide an elastic function to the PCB (15-1 E) when the LED (15-1 L) has been pushed by the outer tube surface (X-Line), so that the LED (15-1 L) will push the PCB (15-1 G) and the two conductive resilient means (15-1 D) and (15-1 C) to move the two LED electrodes (15-1 I) and (15-1 H) off the contact-area (15-1 K) (15-1 J) so that they will not turn-on at all.

As shown in FIG. 15-2, the LEDs (15-2 L) are pushed down and pass through the hole to provide illumination because the LED (15-2 L) is not pressed by the outer tube surface (X-line) so the conductive resilient means (15-2 D) (15-2 C) are extended and push the PCB (15-2 G) down, so that the LED (15-2 L) will be pushed down and cause the LED's two electrodes (15-2 I) (15-2 H) to be pushed to contact the contact areas (15-2 K) (15-2 J) for illumination under predetermined functions. Both LEDs (15-1 L) (15-2 L) have a tip (15-1 P) (15-2 P) made of a very rigid material and smooth round radius so they can easily make the contact with the outer-tube's surface (x-line). When the LED's tip (15-1 P) (15-2 P) falls outside the outer-tube, the LED will be turn on. When the LED's tip (15-1 P) (15-2 P) falls inside the outer-tube, the LED will not turn on at all.

As shown in FIG. 16, the outer-tube (16 A) has two extended inner-light tubes (16 B) (16 B') on each end. Each of the inner-light tubes has a lock-and-release set (same as the earlier discussion of FIGS. 15-1 and FIG. 15-2). Both of the inner-light tubes has a channel (16 G) (16 H) to provide electric signal delivery from the power source (16 P) through the two-way retractable conductive means (16 C) so that the two-way retractable conductive means (16 C) can offer a required length (16 D) (16 E) of conductive means when the inner-light tube has been extended away from the center position of the outer-tube. The two-way retractable conductive means (16 C) can be designed in a number of ways for other applications so it should not limited to the two-way of this preferred embodiment. An equivalent or same function of the retractable conductive means can be provided by an elastic spring, coil, flexible printing circuit board (FPC), conductive wire, or conductive wire harness, which all may still should fall within the scope of the current invention.

The power source (16 P) may be in the form of a DC or AC current supply (not shown) arranged to connect with batteries or a home electricity outlet with a custom DIY (do-it-yourself) length between the plug and the outer-tube.

FIGS. 13, 13-1, 13-2, 14, 15-1, 15-2, and 16, all show a preferred arrangement for a retractable and extendable LED light device with a preferred arrangement for the power source, conductive means, multiple-way retractable conductive means, lock-and-release means, elastic LED or LED-units within the inner-light tube, and power source charged by any available power known to physics, chemistry, or other theory. Furthermore, all alternative arrangements, treatments, designs, methods, or skills may also still fall within the current invention scope.

FIG. 17-1 shows a three-battery power pack in a compact size arrangement (17-1 A) with two terminal ends (17-1 B) (17-1C) for positive and negative contact area. As shown in FIG. 17-2, the three-battery power pack has end-contact areas (17-2 A) (17-2B) that connect through the contact-areas (17-2 E) (17-2 E') with the metal terminals (17-2 C) (17-2 C') to supply positive and negative current to the power source. The small middle size metal terminals (17-2 F) and (17-2 F') connect two of the batteries by connecting the positive and negative current ends with the small contact-terminals (17-2 C) and (17-2 C') to become two big electric ends (17-2 A) and (17-2 B).

FIG. 17 shows the LED light device with changeable LED position and a preferred power source, in which the LED light includes same polarity and dimension LED-units (17A) (17B) (17C) (17D) which have a case including insert-portions (17A") (17W') (17C")(17D") to insert into the receiving-portion (17A') (17B')(17C')(17D') to form a desired changeable LED position by adding or reducing the number of basic LED-units. The LED-units can has a round shape such as in FIG. 17-3 or different shapes as indicated by (17-3A), (17-3B), (17-3C), (17-3D), (17-3E), and (17-3F), and the insert-portions can have the shapes indicated by (17-3A'), (17-3B'), (17-3C'), (17-3D'), (17-3E'), and (17-3F") or any combination for the geometry of the insert-portion and receiving-portion. The electric signal delivery from one to another can be achieved by market available conductive means, resilient conductive means, conductive wires, a conductive plate, conductive terminals, and/or conductive means with multiple-way retractable functions.

The above-discussed preferred embodiments show examples of the current invention, but it is to be appreciated that any alternative or equivalent design, construction, modification, and/or up-grade may still fall within the scope of the invention, which is not limited to the above discussion and mentioned details.

The invention claimed is:

1. An LED light device with changeable functions, including:
   a housing-unit and another housing-unit;
   a joint-unit rotatably connected to said housing-unit and to said another housing-unit, and also electrically connecting said housing-unit to said another housing-unit;
   at least one LED or LED-unit installed within at least one of said housing-unit and said joint-unit and at least a second LED or LED-unit installed on said additional housing-unit, said housing-unit or joint-unit being arranged to change orientation or angle to another orientation or angle with respect to said another housing unit and thereby change geometric dimensions of said LED light device and a relative distance of said at least one LED or LED-unit from said at least one second LED or LED-unit, wherein:
   a desired number of said LEDs or LED-units are provided in a predetermined arrangement and spacing within the housing-unit or joint-unit,
   the light are emitted in a desired direction when an angle of the LED-units, housing-unit, or joint-unit is adjusted or the housing-unit or joint-unit is moved, wherein:
   the LEDs or LED-units emit said light beam to provide predetermined lighting functions with a desired duration, timing, or colors by means of at least one function-determining component,
   a power source is connected to supply AC or DC current to the LEDs or LED-units,
   the LED light device's geometric dimensions are changed when any variable force is applied to said housing-unit or joint-unit to change said orientation or angle of said housing-unit to another orientation or angle of said housing-unit with respect to said orientation or angle of said another housing unit, and
   said light device includes attachment means for attaching the light device to a main object that is bigger than the light device.

2. An LED light device as claimed in claim 1, wherein said power source is an AC or DC power source with circuit means for changing an incoming current into an LED trigger current for providing said predetermined lighting functions.

3. An LED light device as claimed in claim 1, wherein said light device is arranged to be used in a car, truck, van, boar, vessel, airplane, or RV.

4. An LED light device as claimed in claim 1, wherein said LED-units include at least one of a lens, reflector, means for tilting, rotating, extending, or bending said LED-units.

5. An LED light device as claimed in claim 1, wherein said LED-units are arranged as a solid unit with LEDs, a lens, a transmitting medium, and a reflector within said solid unit.

6. An LED light device as claimed in claim 1, wherein the attachment means is selected from the group consisting of glue, double-sided tape, foam tape, hook and loop tape, a chemical adhesive material, at least one screw, a phone hook and catch, at least one rivet, a stand, an assistant stand, a frame, a rack, a bar, a pole, a stick, and a hold tray.

7. An LED light device as claimed in claim 1, wherein the LED-units incorporate at least one optics means for changing said light beam from a spot light beam to a light beam having a wider viewing angle.

8. An LED light device as claimed in claim 1, wherein said LED-units are adjustable over a desired angle.

9. An LED light device as claimed in claim 1, wherein said LED-units have a circuit that works with a desired input current specification and changes the input current into an LED trigger current to provide said predetermined lighting functions, timing, duration, trigger type and cycles, said circuit including said at least one function-determining electrical component.

10. An LED light device as claimed in claim 1, further comprising poles extending from said LED-units and arranged to move freely within a track to a desired position, at which further movement from said desired position is then prevented.

11. An LED light device as claimed in claim 1, wherein said sensor includes a mechanical or electric type sensor.

12. An LED light device as claimed in claim 1, further comprising flexible means for enabling relative movement of said housing-units or joint-unit.

13. An LED light device with changeable functions, comprising:
   at least one LED or LED-unit installed within each of a housing-unit and at least one other housing-unit, said other housing-unit being connected with said housing-unit by flexible means for connecting said housing-units, said flexible means selected from the group consisting of at least one rivet, hinge, chain, screw, metal, plastic part, ring, means for relatively rotating said housing-units, snap, hook, cover, and press-tight connector that are conventionally market available, wherein:

said flexible means enables a position, orientation, or angle of said housing-units to be changed to thereby change dimensions of said light device and a distance of said LED or LED-unit in said housing-unit from an LED or LED-unit in said other housing-unit, each said LED or LED-unit is connected with a power source in the form of an alternating current or direct current source with a circuit that changes incoming current into an LED trigger current to provide a desired light performance, and electrically conductive means for connecting each said LED or LED-unit with the power source through a desired number of said other housing-units to a desired number of said LEDs or LED-units to enable light beams from the LEDs or LED-units to be seen by a viewer according to a predetermined function, timing, duration, features, and performance, and further comprising attachment means for installing said LED light device on any main object that is bigger than said light device.

14. A light device with changeable function, comprising:

at least one LED or LED-unit installed within each of a housing-unit and at least one other housing-unit, said other housing-unit being connected with said housing-unit by flexible means for connecting said housing-units, said flexible means selected from the group consisting of at least one rivet, hinge, chain, screw, metal, plastic part, ring, means for relatively rotating said housing-units, snap, hook, cover, and press-tight connector that are conventionally market available, wherein:

said flexible means enables a position, orientation, or angle of said housing-units to be changed to thereby change dimensions of said light device and a distance of said LED or LED-unit in said housing-unit from to an LED or LED-unit in said other housing-unit, each said LED or LED-unit is connected with a power source in the form of an alternating current or direct current source with a circuit that changes incoming current into an LED trigger current to provide a desired light performance, electrically conductive means for connecting each said LED or LED-unit with the power source is selected from the group consisting of a conductive resilient element, a conductive metal spring, a conductive metal ring, a conductive wire, a conductive metal piece, a multiple-way retractable function conductive mechanism, and parts having an equivalent function to supply electricity from the power source through a desired number of said other housing-units to a desired number of said LEDs or LED-units to enable light beams from the LEDs or LED-units to be seen by a viewer according to a predetermined function, timing, duration, features, and performance, and attachment means for installing said light device on a main object larger than said light device.

15. A light device with changeable geometric dimension function, comprising:

at least one light means installed with a housing-unit or joint-unit, said housing-unit being connected to another housing-unit by said joint-unit, said joint-unit being arranged to deliver electric signals from a power source to said light means and incorporating means for causing said light means to illuminate with a predetermined light performance, wherein said light device's geometric dimension is changed when a variable force is applied to the housing-unit or joint-unit in order to change an orientation of said housing-unit relative to said another housing-unit or another said joint-unit and thereby change a distance of light means in respective said housing-units or joint-units from each other, and said light device incorporates attachment means for installing said light device on a main object larger than said light device.

16. A light device as claimed in claim 14 or 15, wherein the light device incorporates batteries charged by a solar module, charger, wind power generator, hand held generator, or motor generator.

* * * * *